US012669759B2

(12) United States Patent
Hiramatsu et al.

(10) Patent No.: US 12,669,759 B2
(45) Date of Patent: Jun. 30, 2026

(54) TONER

(71) Applicant: CANON KABUSHIKI KAISHA, Tokyo (JP)

(72) Inventors: Tohru Hiramatsu, Shizuoka (JP); Tomohisa Sano, Shizuoka (JP); Hiroki Kagawa, Shizuoka (JP); Kazuyuki Sato, Kanagawa (JP); Shohei Shibahara, Shizuoka (JP)

(73) Assignee: CANON KABUSHIKI KAISHA, Tokyo (JP)

(*) Notice: Subject to any disclaimer, the term of this patent is extended or adjusted under 35 U.S.C. 154(b) by 490 days.

(21) Appl. No.: 18/305,103

(22) Filed: Apr. 21, 2023

(65) Prior Publication Data

US 2023/0350319 A1 Nov. 2, 2023

(30) Foreign Application Priority Data

Apr. 28, 2022 (JP) ................................ 2022-075105

(51) Int. Cl.
*G03G 9/097* (2006.01)
*G03G 9/08* (2006.01)

(52) U.S. Cl.
CPC ....... *G03G 9/09725* (2013.01); *G03G 9/0819* (2013.01)

(58) Field of Classification Search
CPC . G03G 9/09708; G03G 9/0825; G03G 9/0821
See application file for complete search history.

(56) References Cited

U.S. PATENT DOCUMENTS

| | | | | |
|---|---|---|---|---|
| 5,641,601 | A * | 6/1997 | Mitani | G03G 9/0833 430/903 |
| 5,981,131 | A * | 11/1999 | Hirama | C09C 3/12 430/108.7 |
| 6,287,739 | B1 * | 9/2001 | Kawakami | G03G 9/0819 430/108.7 |
| 7,402,368 | B2 | 7/2008 | Ogawa | |
| 10,782,623 | B2 | 9/2020 | Yoshiba | |
| 2003/0031946 | A1 | 2/2003 | Sugiura | |
| 2006/0067867 | A1 | 3/2006 | Ishibashi | |
| 2010/0027103 | A1 | 2/2010 | Franck | |
| 2010/0273103 | A1 | 10/2010 | Baba et al. | |
| 2011/0311910 | A1 | 12/2011 | Matsui et al. | |
| 2012/0107741 | A1 * | 5/2012 | Hiraoka | G03G 9/0821 430/137.12 |
| 2013/0296578 | A1 * | 11/2013 | Amano | G03G 9/09725 549/214 |
| 2014/0377696 | A1 * | 12/2014 | Hasegawa | G03G 9/08 430/108.3 |
| 2015/0185644 | A1 | 7/2015 | Matsui et al. | |
| 2015/0378274 | A1 * | 12/2015 | Abe | G03G 9/09364 430/110.2 |
| 2018/0074421 | A1 | 3/2018 | Uchino et al. | |
| 2018/0246430 | A1 | 8/2018 | Tanaka | |
| 2019/0113858 | A1 * | 4/2019 | Kamae | G03G 9/0804 |
| 2021/0302855 | A1 | 9/2021 | Torii et al. | |

FOREIGN PATENT DOCUMENTS

| | | | | |
|---|---|---|---|---|
| EP | 2799929 | A1 | 11/2014 | |
| EP | 2853945 | A1 | 4/2015 | |
| JP | H07330324 | A | 12/1995 | |
| JP | H09204065 | A | 8/1997 | |
| JP | H11174727 | A | 7/1999 | |
| JP | 2000147831 | A | 5/2000 | |
| JP | 2002-023413 | A | 1/2002 | |
| JP | 2002182423 | A | 6/2002 | |
| JP | 2004126249 | A | 4/2004 | |
| JP | 2004126251 | A | 4/2004 | |
| JP | 2007114630 | A | 5/2007 | |
| JP | 2007176747 | A | 7/2007 | |
| JP | 2008145490 | A | 6/2008 | |
| JP | 2009031426 | A | 2/2009 | |
| JP | 2009271394 | A | 11/2009 | |
| JP | 2009276643 | A | 11/2009 | |
| JP | 2016066049 | A | 4/2016 | |
| JP | 2016-167029 | * | 9/2016 | G03G 9/087 |
| JP | 2016167029 | A | 9/2016 | |
| JP | 2019003082 | A | 1/2019 | |
| JP | 2019086705 | A | 6/2019 | |
| JP | 2019109416 | A | 7/2019 | |
| JP | 2020091471 | A | 6/2020 | |
| JP | 2020095081 | A | 6/2020 | |
| JP | 2020154294 | A | 9/2020 | |
| JP | 2021148999 | A | 9/2021 | |
| WO | 2004060803 | A1 | 7/2004 | |

OTHER PUBLICATIONS

Translation of JP 2016-167029.*

* cited by examiner

*Primary Examiner* — Peter L Vajda
(74) *Attorney, Agent, or Firm* — VENABLE LLP

(57) ABSTRACT

A toner includes a toner particle including a release agent, and a silica fine particle on a surface of the toner particle. Fragment ions corresponding to a D unit structure are observed in a specific measurement; when the silica fine particle is dispersed in a mixed solution of ethanol and aqueous solution of NaCl, followed by a titration operation using sodium hydroxide a titer is within a specific range; in a chemical shift obtained by a specific measurement, with D as an area of a peak having a peak top present in a range from −25 to −15 ppm, and with D1 as an area of a peak having a peak top present in a range of more than −19 ppm and −17 ppm or less, D and D1 are in a specific ratio. The release agent is present on the surface of the toner particle.

11 Claims, No Drawings

TONER

BACKGROUND OF THE INVENTION

Field of the Invention

The present disclosure relates to a toner used in image-forming methods such as electrophotographic methods.

Description of the Related Art

Recent years have witnessed ongoing diversification in the usage goals and usage environments of image forming apparatuses such as copiers and printers, as well as further demands in terms of higher speeds and higher image quality in such apparatuses. When apparatus speed is increased, however, the temperature of the apparatus rises on account of the higher process speed, and as a result image density and the image quality are prone to worsen accompanying toner degradation. A kneaded and pulverized toner particle containing a release agent has the release agent present on the surface, and accordingly a good release effect can be achieved even when process speed is high. On the other hand, however, a release agent portion on the toner surface has lower resistance than a resin portion on the toner surface; as a result, charging unevenness occurs readily, and charging performance tends significantly to drop.

In this regard, a technique has been disclosed (Japanese Patent Application Publication No. 2007-114630) in which charging unevenness on the toner surface can be suppressed, and high-quality images with good resolution can be obtained, through external addition of silica particles the surface whereof has been hydrophobized with a cyclic siloxane or dimethyl silicone oil. A technique has also been disclosed (Japanese Patent Application Publication No. 2016-167029) in which silica particles having been surface-treated with a specific or greater amount of a cyclic siloxane are used as an external additive, to thereby improve the charge rising performance of the toner, and improve image quality performance and durability.

Also, a technique has been disclosed (Japanese Patent Application Publication No. 2007-176747) pertaining to surface-coated silica particles that hold a certain amount of free silicone oil, the particles being obtained as a result of a coating treatment with two or more kinds of silicone oils as external additives, such that hydrophobicity, charging environment stability and durability are improved.

Although in the above techniques charging characteristics and environment stability are satisfactory to some degree, there remains however room for improvement in terms of improving the charging performance of a toner containing a toner particle having a release agent present on the surface. It has been found that the toners disclosed in Japanese Patent Application Publication Nos. 2007-114630 and 2016-167029 are not suitable for a treatment of a toner particle with a cyclic siloxane or silicone oil. Therefore, although a certain effect is observed in terms of initial environment stability, the treated surface of the silica fine particle deteriorates readily with use, and hydrophilic groups on the surface of the silica fine particle become exposed. In a high-temperature, high-humidity environment, in particular, charging performance exhibits degradation due to the influence of moisture, and machine models that output large numbers of prints fail to deliver a stable charging performance. It has moreover been found that deterioration of the treated surface of a silica fine particle is more pronounced in toners that contain a toner particle having a release agent present on the surface.

The toner disclosed in Japanese Patent Application Publication No. 2007-176747 has proved to exhibit an inappropriate treatment amount of cyclic siloxane and silicone oil on the toner particle. Therefore, although a certain effect is elicited herein in terms of environment stability, the effect of improving charging performance as a toner is weak, and flowability is also low; in consequence, it has been found that there is room for improvement in terms of charging stability in continuous use for machine models that output a large number of prints.

SUMMARY OF THE INVENTION

As described above, unique charging performance can be imparted to silica in the form of silica having been coated with conventional cyclic siloxane and silicone oil. It has however been found that meeting required charging stability has become difficult in recent years, in particular in toners with an exposed release agent. Specifically, the present disclosure provides a toner that has excellent charge quantity and charging stability and in which fogging can be suppressed, also in a toner that contains a toner particle having a release agent present on the surface.

Exhaustive studies by the inventors have revealed that the above disadvantages can be solved by the toner below, and arrived at the present disclosure on the basis of that finding.

That is, the present disclosure relates to a toner comprising a toner particle comprising a binder resin and a release agent, and a silica fine particle on a surface of the toner particle, wherein fragment ions corresponding to a structure represented by Formula (1) are observed in a measurement of the silica fine particle by time-of-flight secondary ion mass spectrometry;

(1)

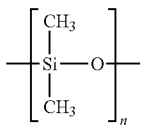

in Formula (1), n represents an integer of 1 or more; when 2.00 g of the silica fine particle is dispersed in a mixed solution of 25.0 g of ethanol and 75.0 g of a 20 mass % aqueous solution of NaCl, followed by a titration operation using sodium hydroxide, Sn defined by Formula (10) satisfies Formula (2); $0.05 \leq Sn \leq 0.20$ (2): $Sn=\{(a-b)\times c\times NA\}/(d\times e)$ (10): in Formula (10), a is a NaOH titer (L) required to adjust to 9.0 a pH of the mixed solution in which the silica fine particle has been dispersed, b is a NaOH titer (L) required to adjust to 9.0 a pH of the mixed solution of 25.0 g of ethanol and 75.0 g of a 20 mass % aqueous solution of NaCl, c is a concentration (mol/L) of the NaOH solution used for titration, NA is Avogadro's number, d is a mass (g) of the silica fine particle, and e is a BET specific surface area ($nm^2/g$) of the silica fine particle; in a chemical shift obtained by solid-state $^{29}Si$—NMR DD/MAS of the silica fine particle, with D denoting an area of a peak having a peak top present in a range from −25 to −15 ppm, S denoting the sum total of areas of peaks of an M unit, a D unit, a T unit and a Q unit present in a range from −140 to 100 ppm, and B ($m^2/g$) denoting a specific surface area of the silica fine particle, a value (D/S)/B of a ratio of (D/S) relative to B is $5.7\times10^{-4}$ to $4.9\times10^{-3}$; (D/S)/B measured after washing of the silica fine particle with chloroform is $1.7\times10^{-4}$ to $4.9\times10^{-3}$; with D1 as an area of a peak having a peak top present in a range of more than −19 ppm and −17 ppm or less, in the chemical shift, a value of a ratio (D1/D) of D1 relative to D is 0.10 to 0.30; and the release agent is present on the surface of the toner particle.

The present disclosure succeeds in providing a toner that has excellent charge quantity and charging stability and in which fogging can be suppressed, also in a toner that contains a toner particle having a release agent present on the surface. Further features of the present disclosure will become apparent from the following description of exemplary embodiments.

DESCRIPTION OF THE EMBODIMENTS

In the present disclosure, the terms "from XX to YY" and "XX to YY", which indicate numerical ranges, mean numerical ranges that include the lower limits and upper limits that are the end points of the ranges. In cases where numerical ranges are indicated incrementally, upper limits and lower limits of the numerical ranges can be arbitrarily combined. The term "monomer unit" describes a reacted form of a monomeric material in a polymer.

Firstly, a toner comprising a toner particle having a release agent present on the surface has a release agent portion in which part of the release agent is exposed; as a result, a good release effect can be readily obtained even when process speed is high. This phenomenon is conspicuous in high-speed machines. A conceivable underlying reason for this is the amount of heat that is applied to a toner layer that is developed on the paper surface. The higher the speed of the machine, the harder it is for the amount of heat from a fixing unit to be transferred to the toner layer on the paper surface, and accordingly the fraction of insufficiency melted toner tends to increase. That is, the amount of release agent exuding from the interior of the toner becomes insufficient. Therefore, the release agent becomes exposed on the surface of the toner, and good release performance is achieved as a result.

On the other hand, however, the release agent portion on the toner surface has a lower resistance than that of the resin portion on the toner surface; as a result, charging unevenness is prone to occur, and charging performance tends to drop. This tendency is pronounced in a high-temperature, high-humidity environment. As a result of diligent research aimed at improving the charging performance of a toner particle, the inventors found that the above tendency can be canceled by combining a silica fine particle such as the one below, with a toner particle, and arrived at the present disclosure on the basis of that finding.

An explanation follows next on the silica fine particle of the present disclosure. The inventors focused first on the surface of a silica fine particle. The surface of a silica fine particle has hydroxy groups (OH groups) i.e. silanol groups included in the silanol structure, and hence the surface of the particle is hydrophilic. Therefore, the surface of the silica fine particle readily adsorbs moisture in the air. In consequence, impairment of charging performance accompanying on account of adsorption of moisture occurs readily in particular in a high-temperature, high-humidity environment. However, the silanol amount cannot be wholly controlled simply by increasing the surface treatment amount on a silica fine particle substrate for the purpose of reducing the amount of surface silanol groups of the silica fine particle, and thus no improvement in charging performance in a high-temperature, high-humidity environment is observed. In addition, also the flowability of the toner worsens, and there occur image adverse effects such as streaks and haze derived from toner aggregation.

Results of exhaustive studies by the inventors on external additives that elicit an improving effect on charging performance, and that allow for charging stability and image output free of adverse effects, revealed that herein it is effective that a surface treatment component of the silica fine particle should have a polydimethylsiloxane structure, coupled with proper control of the amount of dimethylsiloxane in a surface treatment structure, and of the amount of a Si—OR group (where R is a hydrogen atom, a methyl group or an ethyl group) at the terminus of the surface treatment structure of the silica fine particle.

That is, the present disclosure relates to a toner comprising a toner particle comprising a binder resin and a release agent, and a silica fine particle on a surface of the toner particle, wherein fragment ions corresponding to a structure represented by Formula (1) are observed in a measurement of the silica fine particle by time-of-flight secondary ion mass spectrometry;

(1)

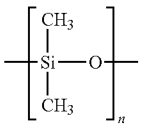

in Formula (1), n represents an integer of 1 or more; when 2.00 g of the silica fine particle is dispersed in a mixed solution of 25.0 g of ethanol and 75.0 g of a 20 mass % aqueous solution of NaCl, followed by a titration operation using sodium hydroxide, Sn defined by Formula (10) satisfies Formula (2); $0.05\leq Sn\leq 0.20$ (2): $Sn=\{(a-b)\times c\times NA\}/(d\times e)$ (10): in Formula (10), a is a NaOH titer (L) required to adjust to 9.0 a pH of the mixed solution in which the silica fine particle has been dispersed, b is a NaOH titer (L) required to adjust to 9.0 a pH of the mixed solution of 25.0 g of ethanol and 75.0 g of a 20 mass % aqueous solution of NaCl, c is a concentration (mol/L) of the NaOH solution used for titration, NA is Avogadro's number, d is a mass (g) of the silica fine particle, and e is a BET specific surface area ($nm^2/g$) of the silica fine particle; in a chemical shift obtained by solid-state $^{29}Si$—NMR DD/MAS of the silica fine particle, with D denoting an area of a peak having a peak top present in a range from −25 to −15 ppm, S denoting the sum total of areas of peaks of an M unit, a D unit, a T unit and a Q unit present in a range from −140 to 100 ppm, and B ($m^2/g$) denoting a specific surface area of the silica fine particle, a value (D/S)/B of a ratio of (D/S) relative to B is $5.7\times10^{-4}$ to $4.9\times10^{-3}$; (D/S)/B measured after washing of the silica fine particle with chloroform is $1.7\times10^{-4}$ to $4.9\times10^{-3}$; with D1 as an area of a peak having a peak top present in a range of more than −19 ppm and −17 ppm or less, in the chemical shift, a value of a ratio (D1/D) of D1 relative to D is 0.10 to 0.30; and the release agent is present on the surface of the toner particle.

An explanation follows next on the reasons why controlling the surface treatment state of the silica fine particle (Formula (2), (D/S)/B and D1/D) allows improving charge quantity, achieving charging stability, and suppressing fogging, also in a toner that contains a toner particle having a release agent present on the surface.

Fragment ions corresponding to the structure represented by Formula (1) must be observed in a measurement of the silica fine particle by time-of-flight secondary ion mass spectrometry TOF-SIMS. When fragment ions represented by Formula (1) are observed, this signifies that the silica fine particle has been surface-treated with a surface treatment agent having a polydimethylsiloxane structure. Polydimethylsiloxane is hydrophobic; thus a surface treatment with a treatment agent having a polydimethylsiloxane structure allows preventing the silica fine particle from adsorbing water, into the toner, in a high-temperature, high-humidity environment.

(1)

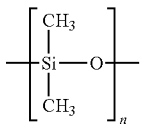

In Formula (1), n is an integer of 1 or more (preferably from 1 to 500, more preferably from 1 to 200, yet more preferably from 1 to 100, and still more preferably from 1 to 80).

Herein TOF-SIMS is a method for analyzing the composition of a sample surface by irradiating a sample with ions, and analyzing the mass of secondary ions emitted from the sample. Secondary ions are emitted from a region several nanometers deep from the sample surface; as a result, this allows analyzing the structure in the vicinity of the surface of the silica fine particle. The mass spectrum of secondary ions obtained as a result of the measurement corresponds to fragment ions that reflect the molecular structure of the surface treatment agent of the silica fine particle.

Fragment ions corresponding to the structure represented by Formula (1) in the silica fine particle is observed in a measurement by TOF-SIMS. A structural unit having such a structure is defined as a D unit in the present disclosure. If fragment ions of a D unit are observed by TOF-SIMS, this signifies that the silica fine particle has been surface-treated with a surface treatment agent containing a D unit.

The amount of Si—OR groups (where R is a hydrogen atom, a methyl group or an ethyl group) is the Si—OR group amount in the surface of the silica fine particle substrate and in the surface treatment structure of the silica fine particle i.e. is the below-described sum total of D1. It is deemed that given that Si—OR groups are polarized and exhibit polarity such as Si—O-Rot, the charging performance of the silica fine particle is controlled by the content of the Si—OR groups. Charging performance cannot be achieved if the amount of Si—OR is small. Charging performance readily worsens, in particular in a high-temperature, high-humidity environment, if the amount of Si—OR is excessive. Among Si—OR groups, silanol groups on the surface of the silica substrate readily adsorb moisture, and accordingly are deemed to significantly contribute in particular to impairment of charging. That is, the amount of silanol groups on the surface of the silica fine particle substrate and the amount of silanol groups in the surface treatment structure of the silica fine particle have to be appropriate.

Specifically, when 2.00 g of a silica fine particle is dispersed in a mixed solution of 25.0 g of ethanol and 75.0 g of a 20 mass % aqueous solution of NaCl, followed by a titration operation using sodium hydroxide, Sn defined by Formula (10) must satisfy Formula (2) below.

$$0.05 \leq Sn \leq 0.20 \quad (2)$$

$$Sn = \{(a-b) \times c \times NA\}/(d \times e) \quad (10)$$

In Formula (10), a is a NaOH titer (L) required to adjust to 9.0 a pH of the above mixed solution in which the silica fine particle has been dispersed, b is a NaOH titer (L) required to adjust to 9.0 a pH of the mixed solution of 25.0 g of ethanol and 75.0 g of a 20 mass % aqueous solution of NaCl, c is a concentration (mol/L) of the NaOH solution used for titration, NA is Avogadro's number, d is a mass (g) of the silica fine particle, and e is a BET specific surface area ($nm^2/g$) of the silica fine particle.

When Sn satisfies Formula (2), this signifies that the amount of silanol groups on the surface of the silica fine particle substrate and the amount of silanol groups in the surface treatment structure of the silica fine particle is appropriate. The charging performance of the toner is improved as a result. Herein Sn is preferably from 0.05 to 0.17, and more preferably from 0.07 to 0.15. Within the above ranges, the toner is in a state of being less readily affected by moisture in the environment, and an effect of eliciting good charging performance is obtained, and fogging can be suppressed, also in a toner in which the release agent is exposed.

The value of Sn can be increased by performing a treatment under conditions such that no reaction of the surface treatment agent proceeds, or by only adding the treatment agent in an amount such that the surface of the silica fine particle substrate is not completely covered, so that silanol groups remain on the surface of the silica fine particle substrate. Conversely, the value of Sn can be reduced by treating the surface of the silica fine particle to thereby reduce the number of silanol groups on the surface of the silica fine particle, or by performing the treatment using a surface treatment agent that has no silanol groups. It is also effective to extend the reaction time, or to raise the temperature, during the surface treatment.

As Si—OR group control, it is also necessary herein to control the surface treatment state ((D/S)/B and D1/D) of the silica fine particle. The surface treatment state of the silica fine particle is calculated in accordance with a solid-state $^{29}$Si—NMR DD/MAS method. Quantitative information on the chemical bonding state of the Si atoms in the silica fine particle can be obtained in a DD/MAS measurement method, since in that case all Si atoms in the measurement sample are observed.

Generally, in solid-state $^{29}$Si—NMR, to a Si atom in a solid sample, four types of peaks, namely, an M unit (formula (4)), a D unit (formula (5)), a T unit (formula (6)), and a Q unit (formula (7)), can be observed.

$$M \text{ unit: } (R_i)(R_j)(R_k)SiO_{1/2} \quad (4)$$

$$D \text{ unit: } (R_g)(R_h)Si(O_{1/2})_2 \quad (5)$$

$$T \text{ unit: } R_mSi(O_{1/2})_3 \quad (6)$$

$$Q \text{ unit: } Si(O_{1/2})_4 \quad (7)$$

$R_i$, $R_j$, $R_k$, $R_g$, $R_h$, and $R_m$ in the formulas (4), (5), and (6) are each an alkyl group such as a hydrocarbon group having from 1 to 6 carbon atoms, a halogen atom, a hydroxy group, an acetoxy group, an alkoxy group, or the like bonded to silicon.

When a silica fine particle is measured by DD/MAS, the Q unit indicates a peak corresponding to Si atoms in the silica fine particle base before surface treatment. In the present disclosure, when a silica fine particle is surface-treated with a surface treatment agent such as silicone oil, the silica fine particle is assumed to include the portion derived from the surface treatment agent. In addition, a silica fine particle before being surface-treated is also referred to as a silica fine particle base. The M unit, D unit, and T unit each show a peak corresponding to the structure of the surface treatment agent for silica fine particles represented by the above formulas (4) to (6).

Each can be identified by the chemical shift value of the solid-state $^{29}$Si—NMR spectrum, the chemical shift being from −130 ppm to −85 ppm for the Q unit, from −65 ppm to −51 ppm for the T unit, from −25 ppm to −15 ppm for the D unit, and from 10 to 25 ppm for the M unit, and each unit can be quantified by a respective integrated value. The respective peak integrated values are denoted by Q, T, D, and M, and the sum of these integrated values is denoted by S.

In the chemical shift obtained by solid-state $^{29}$Si—NMR DD/MAS of the silica fine particle, D denotes the surface area of a peak having a peak top present in the range from −25 to −15 ppm, and S denotes the sum total of the surface areas of the peaks of an M unit, a D unit, a T unit and a Q unit present in the range from −140 to 100 ppm. Herein (D/S)/B is $5.7\times10^{-4}$ to $4.9\times10^{-3}$, where B ($m^2/g$) is the BET specific surface area of the silica fine particle after the surface treatment.

The parameter (D/S)/B signifies the Si atomic mass per unit surface area constituting the D unit, relative to the Si atomic mass of the totality of the silica fine particle. Herein a silica fine particle for which fragments represented by Formula (1) are observed in TOF-SIMS and that exhibit a D unit peak in a solid-state $^{29}$Si—NMR proves thus to be a silica fine particle having undergone a surface treatment by a compound having a dimethylsiloxane structure.

That is, the parameter (D/S)/B represents the amount of dimethylsiloxane on the surface of the silica fine particle per unit surface area. The lower the (D/S)/B ratio, the smaller is the amount of dimethylsiloxane on the surface of the silica fine particle, and although the flowability of the silica fine particle as an external additive is not hindered thereby, the improvement in charging performance is nevertheless small, since the influence of moisture in a high-temperature, high-humidity environment cannot be suppressed due to the fact that silanol groups are prone to remain on the silica substrate surface.

Conversely, the higher the (D/S)/B ratio, the greater is the amount of dimethylsiloxane on the surface of the silica fine particle, although charging performance tends to drop on account of hindered flowability of the silica fine particle, as an external additive, when the presence of the D unit is excessive. In a case where the dimethylsiloxane treatment state is not uniform, moreover, silanol groups remain on the surface of the silica fine particle substrate, and as a result charging performance readily worsens, in particular in a high-temperature, high-humidity environment, when the number of prints is large.

Therefore, (D/S)/B must be from $5.7\times10^{-4}$ to $4.9\times10^{-3}$. When (D/S)/B is lower than $5.7\times10^{-4}$, the dimethylsiloxane treatment is insufficient, and the charging performance of the toner in a high-temperature, high-humidity environment is significantly impaired. When by contrast (D/S)/B exceeds $4.9\times10^{-3}$, the amount of dimethylsiloxane becomes excessive, and the flowability of the toner decreases noticeably. Thus (D/S)/B is preferably from $6.2\times10^{4}$ to $4.9\times10^{-3}$, more preferably from $7.1\times10^{4}$ to $4.9\times10^{-3}$, and yet more preferably from $8.1\times10^{-4}$ to $4.9\times10^{-3}$.

The value of (D/S)/B can be raised by increasing the amount of the surface treatment agent at the time of the surface treatment of the silica fine particle substrate, or by using a surface treatment agent containing a large amount of a component having a polydimethylsiloxane structure. Conversely, the value of (D/S)/B can be lowered by reducing the amount of the surface treatment agent at the time of the surface treatment of the silica fine particle substrate, or by using a surface treatment agent that does not contain a large amount of a component having a polydimethylsiloxane structure.

As a result, the silica fine particle is surface-treated with an appropriate amount of the D unit, and the amount of silanol on the surface of the silica fine particle is controlled so as to lie within an appropriate range. The value of (D/S)/B measured after washing of the silica fine particle with chloroform must be from $1.7\times10^{-4}$ to $4.9\times10^{-3}$. A washing operation removes physically adsorbed surface treatment agent, while leaving the chemically bonded surface treatment agent. Therefore, the value of (D/S)/B after washing denotes the amount of chemically bonded D unit. When (D/S)/B is lower than $1.7\times10^{-4}$, the amount of the surface treatment agent fixed to the surface of the silica fine particle is insufficient, and the surface treatment agent of the silica fine particle sloughs off with long-term use, and thus it is no longer possible to prevent adsorption of moisture in a high-temperature, high-humidity environment. When (D/S)/B is higher than $4.9\times10^{-3}$, the toner tends to exhibit worsened flowability, with poorer charging performance. The value of (D/S)/B after washing of the silica fine particle with chloroform is preferably from $2.5\times10^{-4}$ to $3.2\times10^{-3}$, and more preferably from $7.0\times10^{-4}$ to $1.4\times10^{-3}$.

Herein D1 is defined as a polar group at a terminus of a structure, in the silica fine particle, derived from the surface treatment agent. Specifically, D1 corresponds to a peak having a peak top present in the range of more than −19 ppm and −17 ppm or less, in a chemical shift obtained in the below-described solid-state $^{29}$Si—NMR. In the silica fine particle treated with a D unit, D1 denotes a polar group at a terminus of the D unit, and has the structure represented by Formula (8) below.

$$D1\text{: —Si—OR}^3 \qquad (8)$$

$R^3$ in Formula (8) is a methyl group, an ethyl group or a hydrogen atom.

Diligent research by the inventors has revealed that by virtue of the fact that the silica fine particle has an appropriate amount of polar groups at the terminus of the D units, charging performance is improved in a toner containing a toner particle having a release agent present on the surface. The inventors speculate the following concerning the effect of a polar group at a terminus of the D unit. The polar group of D1 at the terminus of the D unit is moderately more hydrophobic than the polar group, such as a silanol group, of the Q unit that is present on the surface of the silica fine particle substrate. This arises presumably from the influence of hydrophobicity derived from carbon atoms bonded to the Si, to which the polar group is bonded in turn.

The polar group D1 at the terminus of the D unit, which has moderately high hydrophobicity, is polarized, and as a result the oxygen atom in the Si—OR group exhibits negative charge δ. Therefore, the terminus of the structure derived from the surface treatment agent exhibits a high electron-donating character, and an effect is brought about of imparting charging performance to the terminus of a hydrophobic group. In addition, the silica fine particle is little affected by moisture, and thus good charging performance can be readily maintained, by virtue of the fact that the polar group D1 at the terminus of the D unit is more hydrophobic than the silanol groups present on the surface of the silica fine particle substrate.

As represented by (D/S)/B after washing with chloroform, moreover the D unit is bonded to the silica fine particle substrate to a certain extent, and D1 at the terminus of the D unit is present at a position spaced from the surface of the silica fine particle substrate. Therefore, the Si—OH group of D1 better suppresses the influence of moisture on the silica fine particle substrate, and allows good charging performance to be more readily maintained, than do the silanol groups present on the surface of the silica fine particle substrate.

Accordingly, the surface of the silica fine particle is treated with a treatment agent having a D unit, to control the amount of silanol groups on the surface of the silica fine particle to an appropriate amount, and to introduce a certain amount of D1 at the terminus of the D unit. That is, (D/S)/B, and (D/S)/B after washing with chloroform, plus D1/D, are adjusted to appropriate ranges. By satisfying these conditions it becomes possible to increase charge quantity even in high-temperature, high-humidity environments.

In addition, it is deemed that the adhesion state of the silica fine particle changes in the release agent portion on the surface of the toner particle, by virtue of the fact that the surface-treated silica fine particle partially holds D1 at the terminus of the D unit. This is presumably because the partial presence of D1 at the terminus of the D unit renders small the friction coefficient between the release agent portion on the surface of the toner particle and the silica fine particle, and good adhesion is brought about between the release agent portion and the silica fine particle. Therefore, it is deemed that by controlling the D1 amount of the silica fine particle, separation of the silica fine particle from the toner and embedding in the toner on account of durability are suppressed, and charging stability is further improved, in a toner containing a toner particle having a release agent present on the surface.

Herein D1 is defined as an area of a peak having a peak top present in a range of more than −19 ppm and −17 ppm or less in the chemical shift obtained by solid-state $^{29}$Si—NMR DD/MAS of the silica fine particle. The value of the ratio (D1/D) of D1 relative to D is 0.10 to 0.30. When D1/D is lower than 0.10, the amount of polar groups is small, and adhesion of the silica fine particle to the release agent portion on the surface of the toner particle drops readily, such that the effect of improving charging fails to be achieved. When D1/D is higher than 0.30, the amount of polar groups is excessively large, and accordingly the influence of moisture increases, and charging performance drops, in particular in a high-temperature, high-humidity environment. Also, fogging increases. Herein D1/D is more preferably from 0.10 to 0.25, and yet more preferably from 0.15 to 0.25.

Herein D1/D can be raised by increasing the content ratio of silanol or a cyclic siloxane in a treatment agent component used in the surface treatment of the silica fine particle substrate. Conversely, D1/D can be reduced by lowering the content ratio of silanol or cyclic siloxane in the treatment agent component used in the surface treatment of the silica fine particle substrate.

Upon separation of the peak of the D unit obtained by solid-state $^{29}$Si—NMR DD/MAS into two, D1 is defined as the surface area of the peak having a peak top present in the range of chemical shift of more than −19 ppm and −17 ppm or less, and D2 is defined as the surface area of a peak having a peak top present in the range from −23 to −19 ppm.

As is known, Si atoms bonded to OR groups at the terminus of the D unit measured in the silica fine particle correspond to a peak D1. It is further known that Si atoms in a dimethylsiloxane chain correspond to a peak D2. That is, it can be concluded that the larger the integrated value of the peak D1, the greater is the amount of polar groups in the terminus of the D unit. That is, D1/D denotes the amount of polar groups in the D unit of the treatment agent. It can thus be concluded that in the treatment state of the silica fine particle the higher the ratio D1/D, the greater is the number of polar groups at the terminus of the D unit.

The toner particle comprises a release agent, such that the release agent is present on the surface of the toner particle. Herein with Sw (area %) as an abundance of the release agent on the surface of the toner particle, Sw is preferably from 10 to 70 area %. The abundance of the release agent at the surface of the toner particle can be measured on the basis of electron staining SEM observation described below.

If the abundance (Sw) of the release agent is 10 area % or higher, the amount of melted and exuding release agent during the fixing process is sufficient; as a result a release effect is obtained, offset is prevented, and image density is improved. When Sw is 70 area % or lower, fogging and streaks derived from toner aggregation are readily suppressed, since the release agent itself has low resistance and exhibits low charging performance, and also the silica fine particle that is externally added to the surface of the toner particle does not become readily embedded into the release agent portion, which translates into improved flowability.

Herein Sw is preferably from 35 to 60 area %, and preferably from 40 to 55 area %. When Sw is 35 area % or higher, the release agent can sufficiently melt and exude during the fixing process, thanks to which a good release effect can be achieved even at high process speeds. Charging of the silica fine particle can be effectively improved when Sw is 60 area % or lower.

The abundance of the release agent can be controlled on the basis of the content of the release agent in the toner particle and on the basis of the production conditions of the toner.

Preferably, with Ssi (area %) as a coverage ratio of the surface of the toner particle by the silica fine particle, calculated on the basis of an observation image of the surface of the toner using a scanning electron microscope, is from 25 to 90 area %. Herein Ssi is more preferably from 30 to 80 area %, yet more preferably from 35 to 60 area %, and particularly preferably from 40 to 55 area %. Charging unevenness derived from the release agent exposed on the surface of the toner can be suppressed, and good flowability and charging performance can be imparted, when Ssi is 25 area % or higher. When Ssi is 90 area % or lower, a sufficient amount of heat is transferred to the toner in a fixing process; as a result, a sufficient release effect is elicited, and low-temperature fixing performance is brought out. Further, Ssi can be controlled on the basis of the addition amount of the silica fine particle to the toner particle.

The value (Sw/Ssi) of a ratio of the abundance Sw of the release agent on the surface of the toner particle relative to the coverage ratio Ssi by the silica fine particle is preferably from 0.18 to 2.80. Further, Sw/Ssi is more preferably from 0.40 to 2.40, yet more preferably from 0.70 to 2.33, particularly preferably from 0.85 to 2.10, and especially preferably from 0.88 to 1.35. By setting Sw/Ssi to 0.18 or higher, it becomes possible to achieve both a low-temperature fixing effect by release agent exposure, and an effect of improving the charging performance by the surface-treated silica. When Sw/Ssi is 2.80 or lower, the coverage ratio by the silica fine particle with respect to the abundance of the release agent on the surface of the toner particle is appropriate, and charging stability can be further improved.

A carbon amount immobilization rate (C amount immobilization rate) upon washing of the silica fine particle with chloroform is preferably 30 to 70%, more preferably 50 to 70%, and yet more preferably 60 to 65%.

The carbon contained in the silica fine particle is derived from carbon in the surface treatment agent, and can be controlled by modifying the structure of the surface treatment agent, and by modifying treatment conditions (treatment temperature, treatment time, viscosity, addition amount and so forth). The carbon amount immobilization rate is considered to correspond to the amount of the surface treatment agent that is chemically bonded, or is strongly physically bonded, to the silica substrate surface.

The deagglomeration ability and the coefficient of friction between the silica fine particles can be controlled to lie within appropriate ranges by controlling the C amount immobilization rate by the surface treatment agent so as to lie in the above ranges. The same properties can be imparted to, and charging performance can be improved in, the toner to which the silica fine particle is externally added. In a case where the C amount immobilization rate is high and the treated surface is maintained, adhesion between the release agent portion and the silica fine particle is good on the surface of the toner particle, and the durability and charging stability of the toner are improved.

The content of the silica fine particle is preferably from 0.2 to 2.2 parts by mass, more preferably from 0.3 to 2.0 parts by mass, yet more preferably from 0.4 to 2.0 parts by mass, and particularly preferably from 0.7 to 1.5 parts by mass, relative to 100 parts by mass of the toner particle. The effect of improving the charging performance can be brought out, without detracting from the release effect of the release agent on the surface of the toner particle, by setting the content of the silica fine particle to lie within the above range.

The number-average particle diameter of primary particle of the silica fine particle is preferably 5 to 50 nm, more preferably 10 to 40 nm, and yet more preferably 15 to 25 nm. By externally adding a silica fine particle having a particle diameter within this range to the toner particle it becomes possible to adjust characteristics such as the charging performance and the flowability of the toner, to yield a good developing characteristic, while also the flowability and charging performance that is imparted to the toner can be readily ensured throughout durability.

The silica fine particle preferably contain silica fine particle with a small particle diameter and silica fine particle with a large particle diameter. The number-average particle diameter of the primary particle of the small-diameter silica fine particle is preferably from 5 nm to 25 nm, more preferably from 10 nm to 25 nm. The number-average particle diameter of the primary particle of the large-diameter silica fine particle is preferably more than 25 nm and 55 nm or less, more preferably from 30 nm to 40 nm.

The BET specific surface area of the small-diameter silica fine particle is preferably from 100 $m^2/g$ to 500 $m^2/g$, more preferably from 150 $m^2/g$ to 300 $m^2/g$. Also, the BET specific surface area of the large-diameter silica fine particle is preferably from 10 $m^2/g$ to 100 $m^2/g$, more preferably from 30 $m^2/g$ to 80 $m^2/g$.

The mass-based content ratio of the small-diameter silica fine particle and the large-diameter silica fine particle is preferably from 20:1 to 5:1, more preferably from 15:1 to 7:1 (small-diameter silica fine particle: large-diameter silica fine particle).

The BET specific surface area B of the silica fine particle after surface treatment is preferably from 40 $m^2/g$ to 200 $m^2/g$, more preferably from 100 $m^2/g$ to 150 $m^2/g$.

It has been found that a toner having small-diameter silica fine particle externally added thereto is in a state in which the small-diameter silica fine particle is embedded in the surface of the toner particle. This state is brought about for instance on account of stress with the carrier when the toner is used as a two-component developer, stress from a developing blade and a developing sleeve when the toner is used as a one-component developer, as well as collisions of the toner particle against the inner wall of a developing device, a toner stirring blade, and other toner particles. In order to reduce embedding of the small-diameter silica fine particle it is effective to incorporate a small-diameter silica fine particle and a large-diameter silica fine particle as described above.

A large-diameter silica fine particle elicits an effect as a spacer particle; as a result, it becomes possible to prevent direct contact of the toner surface, having a small-diameter silica fine particle adhered thereto, to the carrier, the developing blade, the developing roller, the developing device inner wall, the toner stirring member, and another toner particle. Stress is reduced as a result. In consequence, the small-diameter silica fine particle is prevented from becoming embedded into the surface of the toner particle, and the life of the toner can be extended.

The number-average particle diameter of the silica fine particle can be controlled by modifying conditions in the production process of the silica fine particle, for instance in a classification step, and can be controlled by adjusting the mixing ratio of the small-diameter silica fine particle and the large-diameter silica fine particle, as well as the number-average particle diameters of the foregoing.

More preferably, the silica fine particle is surface-treated with at least a compound represented by Formula (3) below.

(3)

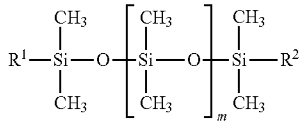

In Formula (3), $R^1$ and $R^2$ each independently represent a carbinol group, a hydroxy group, an epoxy group, a carboxy group, an alkyl group (preferably having carbon atoms of 1 to 6, more preferably having carbon atoms of 1 to 3) or a hydrogen atom. Further, m is the average number of repeating units, and is an integer from 1 to 200 (preferably from 30 to 150, more preferably from 70 to 130).

The surface treatment agent of Formula (3) allows further improving charging stability in environments at yet higher temperature and higher humidity. The surface treatment agent that is used is not particularly limited, so long as it is a compound represented by Formula (3), and known surface treatment agents can be used. The surface treatment agent may be used singly or in combinations of two or more types. Two or more types of surface treatment agents having different functional groups may be used sequentially or mixed with each other; alternatively, two or more types of surface treatment agents having the same functional groups but different viscosities or molecular weight distributions may be used sequentially or mixed with each other. Whether or not a surface has been treated with the compound represented by Formula (3) can be determined in accordance with a method such as analysis of a mass spectrum obtained by gas-chromatography/mass spectrometry.

In addition to the silica fine particle, the toner preferably comprises a strontium titanate fine particle on the surface of the toner particle. The value (Si/Sr) of an element intensity-basis ratio of a content of the silica fine particle relative to a content of the strontium titanate fine particle, on the basis of an X-ray fluorescence analysis of the toner, is preferably 0.10 to 2.30, more preferably 0.10 to 1.50, and yet more preferably 0.10 to 0.80.

The presence of the strontium titanate fine particle on the surface of the toner particle has the effect of polishing and removing deposits on components inside the apparatus. In addition, the charging performance of the toner is further improved, since the strontium titanate fine particle acts as a microcarrier.

Cleaning performance and charging performance both can be achieved by controlling the Si/Sr ratio so as to lie in the above range. The content ratio of the silica fine particle and the strontium titanate fine particle is calculated on the basis of a ratio of the signal intensity of Si atoms and the signal intensity of Sr atoms in the strontium titanate fine particle, as obtained by X-ray fluorescence analysis of the toner. The measurement method involved in X-ray fluorescence analysis will be explained further on. The ratio Si/Sr can be controlled for instance on the basis of the external addition amount of the silica fine particle and the strontium titanate fine particle.

The content of the strontium titanate fine particle is preferably from 0.01 to 0.70 parts by mass, more preferably from 0.02 to 0.33 parts by mass, yet more preferably from 0.02 to 0.30 parts by mass, and particularly preferably from 0.10 to 0.25 parts by mass, relative to 100 parts by mass of the toner particle. Cleaning performance and charging stability can be both achieved by setting the above ranges.

The toner particle comprises a release agent. The release agent is not particularly limited, and a known release agent can be used.

Specifically, petroleum waxes and derivatives thereof such as paraffin wax, microcrystalline wax, and petrolatum; montan wax and derivatives thereof; hydrocarbon waxes and derivatives thereof, obtained in accordance with the Fischer-Tropsch method; polyolefin waxes and derivatives thereof, typified by polyethylene and polypropylene; natural waxes and derivatives thereof such as carnauba wax and candelilla wax; as well as ester waxes. The above derivatives include oxides, block copolymers and graft-modified products with vinylic monomers. As the ester wax there can be used a monofunctional ester wax, a bifunctional ester wax or a polyfunctional ester wax such as a tetrafunctional or hexafunctional ester wax.

Among the foregoing there is preferably used at least one selected from the group consisting of hydrocarbon waxes and ester waxes. The type of the release agent in the toner particle can be identified in accordance with a method that involves for instance extracting a release agent component in the toner particle using a general-purpose solvent, and analyzing then a mass spectrum obtained by gas chromatography/mass spectrometry.

The content of the release agent is preferably from 0.1 to 15.0 parts by mass, more preferably from 0.5 to 15.0 parts by mass, yet more preferably from 1.0 to 11.0 parts by mass and particularly preferably from 2.0 to 8.0 parts by mass, relative to 100 parts by mass of the binder resin. Good charge quantity and charging stability in the toner can be achieved, and fogging can be suppressed, by setting the content of the release agent to lies in the above ranges.

The content of the release agent can be ascertained by extracting the binder resin and the release agent component from the toner particle using a general-purpose solvent, with separation from an inorganic component by centrifugation or the like, followed once more by solvent extraction using a solvent in which the release agent component is insoluble, whereupon the release agent content is calculated by measuring the weights of the dried binder resin and of the release agent component.

The silica fine particle is preferably a hydrophobized silica particle resulting from thermally treating the silica fine particle substrate together with a cyclic siloxane, followed by a heating treatment with a silicone oil. Specifically, the silica fine particle is preferably a silicone-oil-treated product of a silica fine particle treated with a cyclic siloxane.

The value (X/Y) of a ratio of X parts by mass as the treatment amount by cyclic siloxane to Y parts by mass as the treatment amount by silicone oil, with respect to 100 parts by mass of the silica fine particle, is preferably from 0.60 to 1.20. The above ratio is more preferably from 0.62 to 1.15, and yet more preferably from 0.70 to 1.00. The value of D1/D can be controlled within an intended range by controlling X/Y so as to lie in the above ranges.

Silica fine particle obtained by a known method can be used without any particular limitation as the silica fine particle base which is a base material before surface treatment with silicone oil or the like. Typical examples include fumed silica, wet silica, and sol-gel silica. Also, these may be partially or wholly fused silica.

For the silica fine particle base, it is possible to select, as appropriate, and use a suitable one from fumed silica, wet silica, and the like according to the required properties of individual toners. In particular, fumed silica is excellent in the flowability-imparting effect, and is suitable as a silica fine particle base for use as an external additive for electrophotographic toners.

The silica fine particle obtained by surface treatment on the silica particle base for the purpose of imparting hydrophobicity and flowability is used. As a surface treatment method, there is a method of chemically treating with a silicon compound that reacts with or physically adsorbs to the silica particle base. The method of surface-treating the silica fine particle base is not particularly limited and can be carried out by bringing a surface treatment agent containing siloxane bonds into contact with the silica fine particle. From the viewpoint of uniformly treating the surface of the silica fine particle base and easily achieving the above physical properties, it is preferable to bring the surface treatment agent into contact with the silica fine particle base in a dry manner. As will be described hereinbelow, a method of contacting the vapor of a surface treatment agent with raw silica fine particle, or a method of spraying an undiluted solution of the surface treatment agent or a solution obtained by diluting with various solvents to bring the solution into contact with the silica fine particle base can be used.

As a method for surface-treating a silica fine particle base, a method for producing silica fine particle is preferable that includes a step of surface-treating (dry treatment) the silica fine particle base with a cyclic siloxane as the first treatment, and a step of surface-treating (dry treatment) the silica fine particle base after the cyclic siloxane treatment with silicone oil as the second treatment. The silica fine particle is preferably obtained by treating a silica fine particle with cyclic siloxane and then treating the treatment product with silicone oil. A method for producing a toner preferably includes a step of preparing a silica fine particle obtained by the above method.

Regarding the first treatment, high-temperature treatment with a cyclic siloxane having a low molecular weight can efficiently reduce the amount of silanol groups on the surface of the silica fine particle base and also add a short dimethylsiloxane chain having terminal OH groups to the surface of the silica fine particle base.

The temperature for treating the surface of the silica fine particle base with a cyclic siloxane is preferably 300° C. or higher. Where the temperature is 300° C. or higher, the amount of silanol groups on the surface of the silica fine particle base can be effectively reduced. Moreover, where the treatment temperature is 300° C. or higher, siloxane bonds are generated and broken, and the surface of the silica fine particle base can be treated more uniformly while controlling to obtain uniform siloxane chain lengths.

The temperature for treating the surface of the silica fine particle base with a cyclic siloxane is preferably 310° C. or higher, more preferably 320° C. or higher, and even more preferably 330° C. or higher. Although the upper limit is not particularly limited, it is preferably 380° C. or lower, more preferably 350° C. or lower.

After the cyclic siloxane treatment, the silica fine particle base subjected to the cyclic siloxane treatment is heat-treated with silicone oil as the second treatment. The silicone oil bonds with the terminal OH groups of the component obtained by reaction with the cyclic siloxane in the first treatment, and a long-chain dimethylsiloxane component can be introduced onto the silica fine particle surface. The temperature at which the surface of the silica fine particle base is treated with silicone oil is preferably 300° C. or higher, more preferably 320° C. or higher, and even more preferably 330° C. or higher. Although the upper limit is not particularly limited, it is preferably 380° C. or lower, more preferably 350° C. or lower.

By controlling the treatment amount X with the cyclic siloxane and the treatment amount Y with the silicone oil described above, the amount of silanol component on the surface of the silica fine particle base can be reduced, the above-described D unit amount and D1 amount can be controlled, and the charging stability can be improved, without lowering the flowability of the toner, with a small surface treatment amount.

As the cyclic siloxane, at least one selected from the group consisting of low-molecular-weight cyclic siloxanes having rings with up to 10 members, such as hexamethylcyclotrisiloxane, octamethylcyclotetrasiloxane, decamethylcyclopentasiloxane, and the like, can be used. Among them, octamethylcyclotetrasiloxane is preferred.

In addition, silicone oil indicates an oily substance having a molecular structure with a siloxane bond constituting a main chain, and as long as the above-mentioned formula (3) is satisfied, generally available silicone oils can be used without particular limitation. Specific examples include silicone oils composed of linear polysiloxane skeletons such as dimethyl silicone oil, alkyl-modified silicone oil, olefin-modified silicone oil, fatty acid-modified silicone oil, alkoxy-modified silicone oil, polyether-modified silicone oil, carbinol-modified silicone oil, and the like.

The treatment time in the first treatment and the second treatment varies depending on the treatment temperature and the reactivity of the surface treatment agent used, but is preferably from 5 min to 300 min, more preferably from 30 min to 240 min, and still more preferably from 50 min to 200 min. The treatment temperature and treatment time of the surface treatment within the above ranges are preferable from the viewpoint of sufficiently reacting the treatment agent with the silica fine particle base and from the viewpoint of production efficiency.

The surface treatment agent is brought into contact with the silica fine particle base in the first treatment preferably by a method of contacting the vapor of the surface treatment agent under reduced pressure or in an inactive gas atmosphere such as a nitrogen atmosphere. By using the vapor contact method, the surface treatment agent that does not react with the silica fine particle surface can be easily removed, and the silica fine particle surface can be adequately covered with modifying groups having appropriate polarity. When using the method of contacting the vapor of the surface treatment agent, the treatment is preferably performed at a treatment temperature equal to or higher than the boiling point of the surface treatment agent. The vapor contact may be carried out in multiple batches. When the vapor of the surface treatment agent is brought into contact in an inactive gas atmosphere such as a nitrogen atmosphere, the pressure (gauge pressure) of the vapor of the surface treatment agent in a container is preferably from 50 kPa to 300 kPa, more preferably from 150 kPa to 250 kPa.

The toner particle may contain a binder resin. Examples of the binder resin include vinyl resins, polyester resins, and the like. The binder resin is not particular limited, and known resins can be used.

Specific examples of vinyl resins include polystyrene and styrene-based copolymers such as styrene-propylene copolymer, styrene-vinyl toluene copolymer, styrene-methyl acrylate copolymer, styrene-ethyl acrylate copolymer, styrene-butyl acrylate copolymer, styrene-octyl acrylate copolymer, styrene-methyl methacrylate copolymer, styrene-ethyl methacrylate copolymer, styrene-butyl methacrylate copolymer, styrene-octyl methacrylate copolymer, styrene-butadiene copolymer, styrene-isoprene copolymer, styrene-maleic acid copolymer, styrene-maleic acid ester copolymer, and the like, polyacrylic acid esters, polymethacrylic acid esters, polyvinyl acetate, and the like, and these can be used singly or in combination. Among these, styrene-based copolymers and polyester resins are particularly preferred in view of developing characteristics fixing performance and the like.

Preferably, a charge control agent is added to the toner particle. Effective charge control agents for negative charging include organometallic compounds and chelate compounds; examples thereof are for instance monoazo metal complex compounds; acetylacetone metal complex compounds; and metal complex compounds of aromatic hydroxycarboxylic acids or aromatic dicarboxylic acids. Concrete examples of commercial products of such charge control agents include Spilon Black TRH, T-77 and T-95 (by Hodogaya Chemical Co., Ltd.) and BONTRON (registered trademark)S-34, S-44, S-54, E-84, E-88 and E-89 (by Orient Chemical Industries Co., Ltd.).

Examples of charge control agents for positive charging include nigrosin and modified products thereof with a fatty acid metal salt; onium salts such as quaternary ammonium salts, for instance tributylbenzylammonium 1-hydroxy-4-naphthosulfonate salt and tetrabutylammonium tetrafluoroborate, and phosphonium salts that are analogues of the foregoing, as well as lake pigments of the foregoing; triphenylmethane dyes and lake pigments thereof (examples of laking agents include phosphotungstic acid, phosphomolybdic acid, phosphotungstomolybdic acid, tannic acid, lauric acid, gallic acid, ferricyanic acid and ferrocyanide compounds); metal salts of higher fatty acids; diorganotin oxides such as dibutyltin oxide, dioctyltin oxide and dicyclohexyltin oxide; and diorganotin borates such as dibutyltin borate, dioctyltin borate and dicyclohexyltin borate. Concrete examples of commercially available products of the foregoing include TP-302 and TP-415 (Hodogaya Chemical Co., Ltd.), BONTRON (registered trademark)N-01, N-04 and N-07, and also P-51 (Orient Chemical Industries Co., Ltd.), and Copy Blue PR (Clariant AG).

These charge control agents can be used singly or in combinations of two or more types. In terms of the charge quantity of the toner, the use amount of these charge control agents is preferably from 0.1 to 10.0 parts by mass, more preferably from 0.1 to 5.0 parts by mass, relative to 100 parts by mass of the binder resin.

The toner particle may contain a release agent, as needed, for the purpose of improving fixing performance. The release agent is not particularly limited, and known release agents can be used.

Specifically, petroleum waxes and derivatives thereof such as paraffin wax, microcrystalline wax, and petrolatum; montan wax and derivatives thereof; hydrocarbon waxes and derivatives thereof, obtained in accordance with the Fischer-Tropsch method; polyolefin waxes and derivatives thereof typified by polyethylene and polypropylene; natural waxes and derivatives thereof such as carnauba wax and candelilla wax; as well as ester waxes. The above derivatives include oxides, block copolymers with vinylic monomers, and graft-modified products. As the ester wax there can be used a monofunctional ester wax, a bifunctional ester wax or a polyfunctional ester wax such as a tetrafunctional or hexafunctional ester wax.

The melting point of the release agent is preferably from 60 to 140° C., and more preferably from 70 to 130° C. When the melting point ranges from 60 to 140° C., the toner is readily plasticized at the time of fixing, and fixing performance is improved. A melting point lying within the above range is preferable since in that case for instance outmigration of the release agent is unlikelier to occur, even after long-term storage.

The toner particle may contain a colorant. Examples of the colorant include organic pigments, organic dyes and inorganic pigments; a known colorant can be used herein without particular limitations.

Cyan colorants include copper phthalocyanine compounds and derivatives thereof, anthraquinone compounds and basic dye lake compounds. Concrete examples include the following. C. I. Pigment Blue 1, 7, 15, 15:1, 15:2, 15:3, 15:4, 60, 62 and 66.

Examples of magenta colorants include the following. Condensed azo compounds, diketopyrrolopyrrole compounds, anthraquinone compounds, quinacridone compounds, basic dye lake compounds, naphthol compounds, benzimidazolone compounds, thioindigo compounds and perylene compounds. Concrete examples include the following. C. I. Pigment Red 2, 3, 5, 6, 7, 23, 48:2, 48:3, 48:4, 57:1, 81:1, 122, 144, 146, 150, 166, 169, 177, 184, 185, 202, 206, 220, 221 and 254, and C. I. Pigment Violet 19.

Yellow colorants include condensed azo compounds, isoindolinone compounds, anthraquinone compounds, azo metal complexes, methine compounds and allylamide compounds. Concrete examples include the following. C. I. Pigment Yellow 12, 13, 14, 15, 17, 62, 74, 83, 93, 94, 95, 97, 109, 110, 111, 120, 127, 128, 129, 147, 151, 154, 155, 168, 174, 175, 176, 180, 181, 185, 191, and 194.

Examples of black colorants include carbon black, and those color-matched to the above-mentioned yellow colorant, magenta colorant, cyan colorant and magnetic body.

These colorants can be used singly, mixed with each other, or in the form of a solid solution. The colorant used in the present disclosure is selected in terms of hue angle, chroma, lightness, light fastness, OHP transparency, and dispersibility in the toner particle.

In a case where a magnetic body is used as a colorant in the toner, the magnetic body has, as a main component, a magnetic iron oxide such as triiron tetroxide or γ-iron oxide, and may contain an element such as phosphorus, cobalt, nickel, copper, magnesium, manganese, aluminum or silicon. Such a magnetic body has preferably a BET specific surface area, by a nitrogen adsorption method, from 2 to 30 $m^2/g$, more preferably from 3 to 28 $m^2/g$. Preferred herein is a magnetic body having a Mohs hardness from 5 to 7. Examples of the shape of magnetic body include polyhedral, octahedral, hexahedral, spherical, needle-like and scale-like shapes; among the foregoing, a shape of little anisotropy such as a polyhedral, octahedral, hexahedral or spherical shape is preferred in terms of improving image density.

The addition amount of the colorant is preferably from 1 part by mass to 20 parts by mass, relative to 100 parts by mass of the binder resin or of a polymerizable monomer that makes up the binder resin. In a case where a magnetic powder is used, the addition amount thereof is preferably from 20 parts by mass to 200 parts by mass, and more preferably from 40 parts by mass to 150 parts by mass, relative to 100 parts by mass of the binder resin or of the polymerizable monomer that makes up the binder resin.

In addition to the silica fine particle and the strontium titanate fine particle, the toner may contain other external additives such as inorganic fine particles other than the silica fine particle and the strontium titanate fine particle. The toner can be obtained by externally adding, to the toner particle, an external additive in the form of a silica fine particle, a strontium titanate fine particle, and, as needed, inorganic fine particles other than the silica fine particle and the strontium titanate fine particle. Examples of inorganic fine particles include hydrotalcite compounds, fatty acid metal salts, alumina, and metal oxide fine particles (inorganic fine particles) such as titanium oxide, zinc oxide fine particles, cerium oxide fine particles and calcium carbonate fine particles.

As other external additives there may be used also complex-oxide fine particles that utilize two or more types of metal, and there can be used two or more types of fine particles selected from among arbitrary combinations of the foregoing fine particle groups. Resin fine particles and organic-inorganic composite fine particles of resin fine particles and inorganic fine particles can also be used herein. Preferably, the toner contains titanium oxide particles in addition to the silica fine particle, as an external additive. These other external additives may be subjected to a hydrophobizing treatment by a hydrophobizing agent.

Examples of hydrophobizing agents include chlorosilanes such as methyltrichlorosilane, dimethyldichlorosilane, trimethylchlorosilane, phenyltrichlorosilane, diphenyldichlorosilane, t-butyldimethylchlorosilane, vinyltrichlorosilane; alkoxysilanes such as tetramethoxysilane, methyltrimethoxysilane, dimethyldimethoxysilane, phenyltrimethoxysilane, diphenyldimethoxysilane, o-methylphenyltrimethoxysilane, p-methylphenyltrimethoxysilane, n-butyltrimethoxysilane, i-butyltrimethoxysilane, hexyltrimethoxysilane, octyltrimethoxysilane, decyltrimethoxysilane, dodecyltrimethoxysilane, tetraethoxysilane, methyltriethoxysilane, dimethyldiethoxysilane, phenyltriethoxysilane, diphenyldiethoxysilane, i-butyltriethoxysilane, decyltriethoxysilane, vinyltriethoxysilane, γ-methacryloxypropyltrimethoxysilane, γ-glycidoxypropyltrimethoxysilane, γ-glycidoxypropylmethyldimethoxysilane, γ-mercaptopropyltrimethoxysilane, γ-chloropropyltrimethoxysilane, γ-aminopropyltrimethoxysilane, γ-aminopropyltriethoxysilane, γ-(2-aminoethyl) aminopropyltrimethoxysilane, γ-(2-aminoethyl)aminopropylmethyldimethoxysilane, and the like; silazanes such as hexaethyldisilazane, hexapropyldisilazane, hexabutyldisilazane, hexapentyldisilazane, hexahexyldisilazane, hexacyclohexyldisilazane, hexaphenyldisilazane, divinyltetramethyldisilazane, dimethyltetravinyldisilazane, and the like; silicone oils such as dimethyl silicone oil, methyl hydrogen silicone oil, methylphenyl silicone oil, alkyl-modified silicone oil, chloroalkyl-modified silicone oil, chlorophenyl-modified silicone oil, fatty acid-modified silicone oil, polyether-modified silicone oil, alkoxy-modified silicone oil, carbinol-modified silicone oil, amino-modified silicone oil, fluorine-modified silicone oil, terminally reactive silicone oil, and the like; siloxanes such as hexamethylcyclotrisiloxane, octamethylcyclotetrasiloxane, decamethylcyclopentasiloxane, hexamethyldisiloxane, octamethyltrisiloxane, and the like; and fatty acids and metal salts thereof, such as long-chain fatty acids such as undecylic acid, lauric acid, tridecylic acid, dodecylic acid, myristic acid, palmitic acid, pentadecylic acid, stearic acid, heptadecylic acid, arachidic acid, montanic acid, oleic acid, linoleic acid, arachidonic acid, and the like, and salts of these fatty acids with metals such as zinc, iron, magnesium, aluminum, calcium, sodium, lithium, and the like.

Among these, alkoxysilanes, silazanes, and silicone oils are preferably used because the hydrophobizing treatment may be easily performed. One of these hydrophobizing agents may be used alone, or two or more thereof may be used in combination.

The content of the external additive is preferably from 0.05 to 20.0 parts by mass relative to 100 parts by mass of the toner particle. The content of external additive other than silica fine particle and a strontium titanate fine particle is preferably from 0.1 to 1.0 parts by mass, and more preferably from 0.1 to 0.5 parts by mass, relative to 100 parts by mass of the toner particle.

The weight-average particle diameter (D4) of the toner is preferably from 3.0 to 12.0 μm, more preferably from 4.0 to 10.0 μm. Good flowability can be obtained, and the latent image can be developed faithfully, when the weight-average particle diameter (D4) lies within the above ranges.

The manufacturing method of the toner is not particularly limited, and a known manufacturing method can be adopted. Methods for producing toner include a pulverization method, a polymerization method, a dispersion polymerization method, an association aggregation method, a dissolution suspension method, a suspension polymerization method, an emulsion aggregation method, and the like.

A specific example of a pulverization method for producing toner through a melt-kneading step and a pulverization step is given below, but the invention is not limited thereto.

For example, a binder resin and, if necessary, a colorant, a release agent, a charge control agent and other additives are thoroughly mixed with a mixer such as a Henschel mixer or a ball mill (mixing step). The obtained mixture is melt-kneaded using a thermal kneader such as a twin-screw kneading extruder, a heating roll, a kneader, and an extruder (melt-kneading step).

After cooling and solidifying the resulting melt-kneaded product, pulverization using a pulverizer (pulverization step) and classification using a classifier (classification step) are performed to obtain toner particles. Further, if necessary, toner particles and external additives are mixed with a mixer such as a Henschel mixer to obtain a toner.

Examples of the mixer are presented hereinbelow. FM mixer (Nippon Coke Industry Co., Ltd.); SUPERMIXER (manufactured by Kawata Mfg. Co., Ltd.); RIBOCONE (manufactured by Okawara Mfg. Co., Ltd.); NAUTA MIXER, TURBULIZER, and CYCLOMIX (manufactured by Hosokawa Micron Corporation); SPIRAL PIN MIXER (manufactured by Pacific Machinery & Engineering Co., Ltd.); LÖDIGE MIXER (manufactured by Matsubo Corporation).

Examples of the thermal kneader are presented hereinbelow. KRC kneader (manufactured by Kurimoto, Ltd.); BUSS Co-kneader (manufactured by Buss AG); TEM-type extruder (manufactured by Toshiba Machine Co., Ltd.); TEX twin-screw kneader (manufactured by The Japan Steel Works, Ltd.); PCM kneader (manufactured by Ikegai Iron Works Co., Ltd.); a three-roll mill, a mixing roll mill, and a kneader (manufactured by Inoue Mfg. Inc.); KNEADEX (manufactured by Mitsui Mining Co., Ltd.); MS-type pressurizing kneader and KNEADER-RUDER (manufactured by Moriyama Seisakusho KK); and Banbury mixer (manufactured by Kobe Steel, Ltd.).

Examples of the pulverizer are presented hereinbelow. COUNTER JET MILL, MICRON JET, and INOMIZER (manufactured by Hosokawa Micron Corporation); IDS type mill and PJM jet pulverizer (manufactured by Nippon Pneumatic Mfg. Co., Ltd.); CROSS JET MILL (manufactured by Kurimoto Iron Works Co., Ltd.); ULMAX (manufactured by Nisso Engineering Co., Ltd.); SK Jet-O-Mill (manufactured by Seishin Enterprise Co., Ltd.); KRYPTRON (manufactured by Kawasaki Heavy Industries, Ltd.); TURBO MILL (manufactured by Turbo Kogyo Co., Ltd.); and SUPER-ROTOR (manufactured by Nisshin Engineering Co., Ltd.).

Examples of the classifier are presented hereinbelow. CLASSIEL, MICRON CLASSIFIER, and SPEDIC CLASSIFIER (manufactured by Seishin Enterprise Co., Ltd.); TURBO CLASSIFIER (manufactured by Nisshin Engineering Inc.); MICRON SEPARATOR, TURBOPLEX (ATP), and TSP SEPARATOR (manufactured by Hosokawa Micron Corporation); ELBOW JET (manufactured by Nittetsu Mining Co., Ltd.), DISPERSION SEPARATOR (manufactured by Nippon Pneumatic Industry Co., Ltd.); YM MICRO CUT (Yaskawa Co., Ltd.).

In addition, the following sieving device may be used to sieve coarse particles. ULTRASONIC (manufactured by Koeisangyo Co., Ltd.); RESONATOR SIEVE and GYRO SHIFTER (Tokuju Corporation); VIBRASONIC SYSTEM (manufactured by Dalton Corportaion); SONIC CLEAN (manufactured by Sintokogio, Ltd.); TURBO-SCREENER (manufactured by Turbo Kogyo Co., Ltd.); MICRO SIFTER (manufactured by Makino Mfg. Co., Ltd.); and a circular vibrating screen.

A toner particle is produced, for example, as follows by a suspension polymerization method. For example, a styrene-based monomer and a (meth) acrylic acid ester-based monomer as polymerizable monomers that will form the binder resin, a colorant, a wax component, a polymerization initiator, and the like are homogenously dissolved or dispersed with a disperser such as a homogenizer, a ball mill, an ultrasonic disperser, or the like to prepare a polymerizable monomer composition. The polymerizable monomer composition is dispersed in an aqueous medium to granulate particles of the polymerizable monomer composition, and then the polymerizable monomers in the particles of the polymerizable monomer composition are polymerized to obtain a toner particle.

At this time, the polymerizable monomer composition is preferably prepared by mixing a dispersion liquid obtained by dispersing a colorant in the first polymerizable monomer (or some of the polymerizable monomers) with at least the second polymerizable monomer (or the rest of the polymerizable monomers). That is, the colorant can be made to be present in the polymer particle in a better dispersed state by sufficiently dispersing the colorant in the first polymerizable monomer and then mixing with the second polymerizable monomer together with other toner materials.

A toner particle is obtained by filtering, washing, drying and classifying the obtained polymer particles by known methods. A toner can be obtained by externally adding a silica fine particle to the toner particle obtained as described above.

The external addition of an external additive such as a silica fine particle to the toner particle can be performed by mixing the toner particle and the external additive with the following mixer. Examples of the mixer are presented hereinbelow. Henschel mixer (manufactured by Mitsui Mining Co., Ltd.); SUPERMIXER (manufactured by Kawata Mfg. Co., Ltd.); RIBOCONE (manufactured by Okawara Mfg. Co., Ltd.); NAUTA MIXER, TURBULIZER, and CYCLOMIX (manufactured by Hosokawa Micron Corporation); SPIRAL PIN MIXER (manufactured by Pacific Machinery & Engineering Co., Ldg.); and LÖDIGE MIXER (manufactured by Matsubo Corporation).

From the viewpoint of dispersibility of the external additive, the mixing time in the external addition step is preferably adjusted in the range of from 0.5 min to 10.0 min, more preferably adjusted in the range of from 1.0 min to 5.0 min. The method for producing a toner includes a step of obtaining a toner particle, a step of preparing a silica fine particle, and a step of externally adding the silica fine particle to and mixing with the obtained toner particle to obtain the toner.

Methods for measuring various physical properties will be explained next.

Method for Calculating (D/S)/B and D1/D by Solid-State $^{29}$Si—NMR DD/MAS Measurement of a Silica Fine Particle A solid-state $^{29}$Si—NMR measurement of the silica fine particle is performed through separation of the silica fine particle from the toner surface. An explanation follows next on a method for separating silica fine particle from the toner surface, and on a solid-state $^{29}$Si—NMR measurement.

Method for Separating Silica Fine Particle from Toner Surface

When the silica fine particle separated from the toner surface are used as a measurement sample, the silica fine particle is separated from the toner in the following procedure. A total of 1.6 kg of sucrose (manufactured by Kishida Chemical Co., Ltd.) is added to 1 L of ion-exchanged water and dissolved under heating in a hot water bath to prepare a concentrated sucrose solution. A total of 31 g of the concentrated sucrose solution and 6 mL of CONTAMINON N (a 10% by mass aqueous solution of a neutral detergent for washing precision measuring instruments at pH 7, which consists of a nonionic surfactant, an anionic surfactant, and an organic builder, manufactured by Wako Pure Chemical Industries, Ltd.) are placed in a centrifugation tube to prepare a dispersion liquid. The toner, 10 g, is added to this dispersion liquid, and lumps of the toner are loosened with a spatula or the like. The centrifugation tube is set in the "KM Shaker" (model: V. SX) manufactured by Iwaki Sangyo Co., Ltd. and shaken for 20 min at 350 reciprocations per minute. After shaking, the solution is transferred in a swing rotor glass tube (50 mL) and centrifuged under the conditions of 3500 rpm and 30 min in a centrifuge.

In the glass tube after centrifugation, toner particle is present in the uppermost layer, and an inorganic fine particle mixture containing a silica fine particle is present in the aqueous solution side of the lower layer. The aqueous solution of the upper layer and the aqueous solution of the lower layer are separated and dried to obtain a toner particle from the upper layer side and an inorganic fine particle mixture from the lower layer side. The obtained toner particle is used to measure the abundance ratio of the release agent described hereinbelow. The above centrifugation step is repeated so that the total amount of the inorganic fine particle mixture obtained from the lower layer side is 10 g or more.

Subsequently, 10 g of the resulting inorganic fine particle mixture is added to and dispersed in a dispersion liquid containing 100 mL of ion-exchanged water and 6 mL of CONTAMINON N. The resulting dispersion liquid is transferred to a swing rotor glass tube (50 mL) and centrifuged under the conditions of 3500 rpm and 30 min in a centrifuge. In the glass tube after centrifugation, the silica fine particle is present in the uppermost layer, and other inorganic fine particles are present in the aqueous solution side of the lower layer. The aqueous solution of the upper layer is collected, centrifugal separation is repeated as necessary, and after sufficient separation, the dispersion liquid is dried and the silica fine particle is collected.

Next, solid-state $^{29}$Si—NMR measurement of the silica fine particle recovered from the toner particle is performed under the measurement conditions shown hereinbelow.

DD/MAS Measurement Conditions for Solid-State $^{29}$Si—NMR Measurement

DD/MAS measurement conditions for solid-state $^{29}$Si—NMR measurement are as follows.

Device: JNM-ECX5002 (JEOL RESONANCE)
Temperature: room temperature
Measurement method: DD/MAS method $^{29}$Si 45°
Sample tube: zirconia 3.2 mmq
Sample: filled in test tube in powder form
Sample rotation speed: 10 kHz
Relaxation delay: 180 s
Scan: 2000
Calibration standard material: DSS (sodium 3-(trimethylsilyl)-1-propanesulfonate)

After the above measurement, a plurality of silane components with different substituents and bonding groups are peak-separated into the following M unit, D unit, T unit, and Q unit by curve fitting from the solid-state $^{29}$Si—NMR spectrum of the silica fine particle.

Curve fitting is performed using JEOL JNM-EX400 software EXcalibur for Windows (registered trademark) version 4.2 (EX series). "1D Pro" is clicked from the menu icon to load the measurement data. Next, "Curve fitting function" is selected from "Command" on the menu bar to perform curve fitting. Curve fitting is performed for each component so that the difference (composite peak difference) between the composite peak obtained by combining the peaks obtained by curve fitting and the peak of the measurement result is minimized.

$$M \text{ unit:} (R_i)(R_j)(R_k)SiO_{1/2} \quad (4)$$

$$D \text{ unit: } (R_g)(R_h)Si(O_{1/2})_2 \quad (5)$$

$T$ unit: $R_mSi(O_{1/2})_3$ (6)

$Q$ unit: $Si(O_{1/2})_4$ (7)

$R_i$, $R_j$, $R_k$, $R_g$, $R_h$, and $R_m$ in the formulas (4), (5), and (6) are each a hydrocarbon group such as an alkyl group having from 1 to 6 carbon atoms, a halogen atom, a hydroxy group, an acetoxy group, an alkoxy group, or the like bonded to silicon.

Further, for the D unit peak, waveform separation is performed using the Voigt function, and the area of the peak D1 in the range of more than −19 ppm and −17 ppm or less is calculated. After peak separation, the integrated value of D units present in the chemical shift range of from −25 to −15 ppm. Further, the sum S of all the integrated values of M, D, T, and Q units present in the range of from −140 to 100 ppm are calculated, the BET specific surface area B ($m^2/g$) of the silica fine particle is obtained by the method described hereinbelow, and the ratio (D/S)/B is calculated. Also, the ratio D1/D is calculated from the integrated values of the peaks D1 and D obtained by waveform separation. Furthermore, after the operation of washing the silica fine particle with chloroform is performed as shown below, the same NMR measurement is performed to calculate (D/S)/B after washing.

Washing Silica Fine Particle with Chloroform

A total of 100 mL of chloroform and 1 g of silica fine particle are placed into a centrifuge tube and stirred with a spatula or the like. The tube for centrifugation is set on the KM Shaker and shaken for 20 min at 350 reciprocations per minute. After shaking, the mixture is transferred to a swing rotor glass tube and centrifuged under the conditions of 3500 rpm and 30 min in a centrifuge. The supernatant is discarded, 100 mL of chloroform is added again, and shaking and centrifugation are performed twice. Precipitated silica fine particle is collected and vacuum-dried at 40° C. for 24 h to obtain a washed silica fine particle.

Method for Measuring Fragment Ions on Silica Fine Particle Surface by Time-of-Flight Secondary Ion Mass Spectrometry (TOF-SIMS)

TOF-SIMS measurement of a silica fine particle is performed using the silica fine particle separated from the toner by the above-described method for separating a silica fine particle from the toner surface. TRIFT-IV manufactured by ULVAC-PHI, Inc. is used for fragment ion measurement of silica fine particle surface using TOF-SIMS.

The analysis conditions are as follows.

Sample preparation: silica microparticles are caused to adhere to an indium sheet Primary ion: Au ion.

Accelerating voltage: 30 kV.

Charge neutralization mode: On.

Measurement mode: Positive.

Raster: 200 μm.

Measurement time: 60 s.

Whether fragment ions corresponding to the structure represented by the formula (1) are observed is confirmed from the obtained mass profile of secondary ion mass/secondary ion charge number (m/z). For example, where the surface treatment agent is polydimethylsiloxane or cyclic siloxane, fragment ions are observed at m/z=147, 207, and 221 positions.

Method for Measuring BET Specific Surface Area of Silica Fine Particle

The BET specific surface area of silica fine particle is measured by the following procedure. As a measuring device, "Automatic Specific Surface Area/Pore Size Distribution Measuring Device TriStar 3000 (manufactured by Shimadzu Corporation)", which adopts a gas adsorption method based on a constant volume method as a measuring method, is used. Setting of measurement conditions and analysis of measurement data are performed using the dedicated software "TriStar 3000 Version 4.00" provided with the device. A vacuum pump, a nitrogen gas pipe, and a helium gas pipe are connected to the device. Using nitrogen gas as the adsorption gas, the value calculated by the BET multipoint method is defined as the BET specific surface area.

The BET specific surface area is calculated as follows. First, nitrogen gas is adsorbed on the silica fine particle, and the equilibrium pressure P (Pa) in the sample cell at that time and the nitrogen adsorption amount $V_a$ ($mol \cdot g^{-1}$) of the magnetic bodies are measured. Then, an adsorption isotherm is obtained in which a relative pressure $P_r$, which is the value obtained by dividing the equilibrium pressure P (Pa) in the sample cell by the saturated vapor pressure $P_0$ (Pa) of nitrogen, is plotted against the abscissa, and the nitrogen adsorption amount $V_a$ ($mol \cdot g^{-1}$) is plotted against the ordinate. Next, a monomolecular layer adsorption amount $V_m$ ($mol \cdot g^{-1}$), which is an adsorption amount necessary to form a monomolecular layer on the surface of the silica fine particle, is obtained by using the following BET formula.

$$P_r/V_a(1-P_r)=1/(V_m \times C)+(C-1) \times P_r/(V_m \times C)$$

Here, C is a BET parameter, which is a variable that varies depending on the type of measurement sample, the type of adsorbed gas, and the adsorption temperature.

Where $P_r$ is the X-axis and $P_r/V_a$ $(1-P_r)$ is the γ-axis, the BET formula can be interpreted as a straight line with a slope of $(C-1)/(V_m \times C)$ and an intercept of $1/(V_m \times C)$ (this straight line is called a BET plot).

Slope of straight line$=(C-1)/(V_m \times C)$.

Intercept of straight line$=1/(V_m \times C)$.

By plotting the measured values of $P_r$ and the measured values of $P_r/V_a$ $(1-P_r)$ on a graph and drawing a straight line by using the least squares method, the values of slope and intercept of the straight line can be calculated. Using these values, $V_m$ and C can be calculated by solving the simultaneous equations for the slope and the intercept. Further, the BET specific surface area S ($m^2/g$) of the silica fine particle is calculated based on the following formula from the $V_m$ calculated above and the cross-sectional area occupied by the nitrogen molecule (0.162 $nm^2$).

$$S=V_m \times N \times 0.162 \times 10^{-18}$$

Here, N is Avogadro's number (mol-1).

Specifically, measurements using this device are performed according to the following procedure. The tare of a well-washed and dried dedicated glass sample cell (stem diameter ⅜ inch, volume 5 mL) is accurately weighed. Then, using a funnel, 0.1 g of silica fine particle is placed into this sample cell. The sample cell containing silica fine particle is set in a "PRETREATMENT DEVICE VACUUM PREP 061 (manufactured by Shimadzu Corporation)" to which a vacuum pump and a nitrogen gas pipe are connected, and vacuum degassing is continued at 23° C. for 10 h. The vacuum degassing is gradually performed while adjusting a valve so that the silica fine particle is not sucked into the vacuum pump. The pressure inside the cell gradually decreases in the course of degassing and finally reaches 0.4 Pa (about 3 mTorr). After the vacuum degassing is completed, nitrogen gas is gradually injected to return the inside of the sample cell to atmospheric pressure, and the sample cell is detached from the pretreatment device. The mass of the sample cell is accurately weighed, and the exact mass of the silica fine particle is calculated from the difference from the tare. At this time, the sample cell is covered with a rubber plug during weighing so that the silica fine particle in the sample cell is not contaminated with moisture in the atmosphere.

Next, a dedicated isothermal jacket is attached to the sample cell containing the silica fine particle. A dedicated filler rod is inserted into this sample cell, and the sample cell is set in the analysis port of the device. The isothermal jacket is a cylindrical member with the inner surface made of a porous material and the outer surface made of an impermeable material. The isothermal jacket can suck up liquid nitrogen to a certain level by capillary action. Next, a free space of the sample cell, including the connecting device is measured. The free space is calculated by measuring the volume of the sample cell by using helium gas at 23° C., then measuring the volume of the sample cell after cooling the sample cell with liquid nitrogen by similarly using helium gas, and converting from the difference in volume. In addition, the saturated vapor pressure $P_0$ (Pa) of nitrogen is separately and automatically measured using a $P_0$ tube built into the device.

Next, after the inside of the sample cell is vacuum degassed, the sample cell is cooled with liquid nitrogen while vacuum degassing is continued. Thereafter, nitrogen gas is introduced stepwise into the sample cell to cause the silica fine particle to adsorb nitrogen molecules. At this time, since an adsorption isotherm can be obtained by measuring the equilibrium pressure P (Pa) at any time, this adsorption isotherm is converted into a BET plot. The points of the relative pressure $P_r$ for collecting data are set to a total of 6 points of 0.05, 0.10, 0.15, 0.20, 0.25, and 0.30. A straight line is drawn on the obtained measurement data by the least squares method, and $V_m$ is calculated from the slope and intercept of the straight line. Further, using this $V_m$ value, the BET specific surface area of the silica fine particle is calculated as described above.

Method for Measuring Si—OH Content of Silica Fine Particle

The amount of Si—OH in the silica fine particle can be determined by the following method using the silica fine particle separated from the toner by the method for separating the silica fine particle from the toner surface described above. A sample liquid 1 is prepared by mixing 25.0 g of ethanol and 75.0 g of a 20% by mass sodium chloride aqueous solution. Further, 2.00 g of silica fine particles are accurately weighed in a glass bottle, and a sample liquid 2 is prepared by adding a solvent obtained by mixing 25.0 g of ethanol and 75.0 g of a 20% by mass sodium chloride aqueous solution. The sample liquid 2 is stirred with a magnetic stirrer for 5 min or longer to disperse the silica fine particle. Then, the pH change of each of sample liquids 1 and 2 is measured while dropping 0.1 mol/L sodium hydroxide aqueous solution at 0.01 mL/min. The titer (L) of sodium hydroxide aqueous solution when pH 9.0 is reached is recorded. The amount Sn (/$nm^2$) of Si—OH per 1 $nm^2$ can be calculated from the following formula.

$$Sn=\{(a-b)\times c\times NA\}/(d\times e)$$

a: NaOH titer (L) of sample liquid 2.

b: NaOH titer (L) of sample liquid 1.

c: concentration of NaOH solution used for titration (mol/L).

NA: Avogadro's number.

d: mass of silica fine particle (g).

e: BET specific surface area of silica fine particle ($nm^2$/g: converted from the specific surface area ($m^2$/g) obtained below).

Method for Calculating Coverage Ssi of Surface of Toner Particle by Silica Fine Particle The coverage Ssi of the toner particle surface by the silica fine particle is calculated from a backscattered electron image acquired by observation with a scanning electron microscope (SEM). A backscattered electron image is also called a "composition image", and the smaller the atomic number, the darker the detected image, and the larger the atomic number, the brighter the detected image. The backscattered electron image of the toner is acquired under the following observation conditions. A method for acquiring a backscattered electron image of the toner and a method for calculating the coverage of the toner particle surface by the silica fine particle are described hereinbelow.

Method for Acquiring Backscattered Electron Image of Toner

Apparatus used: ULTRA PLUS, manufactured by Carl Zeiss Microscopy Co., Ltd.

Accelerating voltage: 1.0 kV.

WD: 2.5 mm.

Aperture size: 30.0 μm.

Detection signal: EsB (energy selective backscattered electron).

EsB Grid: 700V.

Observation magnification: 20,000 times.

Contrast: 63.0±5.0% (reference value).

Brightness: 38.0±5.0% (reference value).

Resolution: 1024×768 pixels.

Pretreatment: toner is sprinkled on carbon tape (no Pt vapor deposition).

Contrast and brightness are set, as appropriate, according to the state of the apparatus used. In addition, the accelerating voltage and EsB Grid are set so as to achieve items such as acquisition of structural information on the outermost surface of the toner, prevention of charge-up of an undeposited sample, and selective detection of high-energy backscattered electrons. For the observation field of view, a portion where the curvature of the toner is small is selected.

Method for Calculating Silica Coverage of Toner

The silica coverage is acquired by analyzing the backscattered electron image of the toner outermost surface obtained by the above method using image processing software ImageJ (developed by Wayne Rashand). The procedure is shown below. First, the backscattered electron image to be analyzed is converted to 8-bit from Type in the Image menu. Next, from Filters in the Process menu, the median diameter is set to 2.0 pixels to reduce image noise. Next, the entire backscattered electron image is selected using the Rectangle Tool on the toolbar. Subsequently, Threshold is selected from Adjust in the Image menu, and a luminance threshold (from 85 to 128 (256 gradations, reference value)) is specified so that only luminance pixels derived from the silica fine particle in backscattered electron image are selected. Finally, Measure is selected from the Analyze menu, and the value of the area ratio (% by area) of the luminance selected portion in the backscattered electron image is calculated. The above procedure is performed for 20 fields of view for the toner to be evaluated, and the arithmetic mean value is taken as the coverage Ssi of the toner particle surface by the silica fine particle.

Assessment of the Presence of Release Agent on the Surface of the Toner Particle The presence of the release agent on the surface of the toner particle is ascertained in accordance with the method below.

Separation of a Release Agent Component from Toner

A difference in solubility in a given solvent can be resorted to in order to separate various materials from the toner.

First separation: toner is dissolved in MEK (methyl ethyl ketone) at 23° C., and a resulting soluble fraction (amorphous binder resin) and insoluble fraction (release agent, colorant, inorganic fine particles and so forth) are separated.

Second separation: the insoluble fraction (release agent, colorant, inorganic fine particles) obtained in the first separation is dissolved in MEK at 100° C., and the resulting soluble fraction (release agent) and insoluble fraction (colorant, inorganic fine particles) are separated.

The solvent used in the separations is not particularly limited, so long as it is a solvent in which the release agent is insoluble at normal temperature.

Release Agent Component Analysis

The type of release agent is analyzed by subjecting the release agent component, separated from the toner, to a pyrolysis GC/MS measurement, under the conditions below.

Measuring device: "Voyager" (product name, by Thermo Electron Co., Ltd.)
Pyrolysis temperature: 600° C.
Column: HP-1 (15 m×0.25 mm×0.25 μm)
Inlet: 300° C., Split: 20.0
Injection amount: 1.2 mL/min
Temperature rise: 50° C. (4 min)–300° C. (20° C./min)

Method for Measuring Fragment Ions of Release Agent on the Surface of the Toner Particle by Time-of-Flight Secondary Ion Mass Spectrometry (TOF-SIMS)

The TOF-SIMS measurement of the release agent on the surface of the toner particle is performed using a toner particle resulting from separation, from the toner, of the silica fine particle in accordance with the above-described separation method of a silica fine particle from the toner particle surface. The apparatus TRIFT-IV by Ulvac-Phi, Inc. is used for measuring fragment ions of release agent by TOF-SIMS. The analysis conditions are as follows.

Sample preparation: Adhesion of a toner particle to an indium sheet
Primary ions: Au ions
Accelerating voltage: 30 k V
Charge neutralization mode: On
Measurement mode: Positive
Raster: 200 μm
Measurement time: 60 s The release agent is deemed to be present on the surface of the toner particle if there is observed a peak of fragment ions of a release agent species, identified as a result of the above release agent component analysis on the basis of the obtained mass profile of secondary ion mass/secondary ion charge number (m/z).

Method for Calculating the Abundance Sw of Release Agent on the Surface of the Toner Particle The abundance of the release agent on the surface of the toner particle is calculated through scanning electron microscope (SEM) observation of the surface of the toner particle as obtained in accordance with the above-described separation operation of the silica fine particle and of the toner particle. The abundance of the release agent on the surface of the toner particle can be evaluated as follows.

Method for Electron Staining of a Toner Particle

The toner particle is subjected to electron staining using the following equipment and under the conditions below.

Vacuum electron staining device: VSC1R1H (by Filgen Inc.)
Dye: Ruthenium tetroxide (by Filgen Inc.)
Staining atmosphere density: 100 Pa
Staining time: 5 minutes By staining the surface of the toner particle with ruthenium, clear contrast can be achieved between the resin portion and the release agent portion on the surface of the toner particle, in a backscattered electron image by a scanning electron microscope. This is presumably because the strength of ruthenium staining varies depending for instance on the difference in density between the resin portion and the release agent portion, and the difference in the crystallinity of the binder resin and the release agent. Accordingly, the resin portion and the release agent portion can be discriminated from each other in a below-described backscattered electron image by a scanning electron microscope.

A method for acquiring an SEM backscattered electron image of a stained toner particle will be explained in detail below.

Method for Acquiring a Backscattered Electron Image of a Stained Toner Particle

Device used: ULTRA PLUS by Carl Zeiss Microscopy GmbH
Accelerating voltage: 1.0 kV
WD: 2.5 mm
Aperture size: 30.0 μm
Detection signal: EsB (energy-selective backscattered electron)
EsB Grid: 700 V
Observation magnifications: 20,000 magnifications
Contrast: 63.0±5.0% (reference value)
Brightness: 38.0±5.0% (reference value)
Resolution: 1024×768 pixels
Pretreatment: toner particle sprinkled on carbon tape (without Pt vapor deposition)

Contrast and brightness are set as appropriate depending on the state of the device that is used. The accelerating voltage and EsB grid are set so as to achieve acquisition of structural information about the outermost surface of the toner, forestalling of charge-up of an undeposited sample, and selective detection of high-energy backscattered electrons. A site of small toner curvature is selected as the observation field of view.

Method for Calculating the Abundance of Release Agent on the Surface of the Toner Particle The abundance of the release agent is worked out by analyzing the backscattered electron image of the stained toner particle obtained in accordance with the above method, relying on image processing software ImageJ (developed by Wayne Rashand). The procedure involved is as follows. Firstly, the backscattered electron image to be analyzed is converted to an 8-bit image, from Type in the Image menu. Then, through Filters in the Process menu, the Median diameter is set to 2.0 pixels, to reduce image noise. The entire backscattered electron image is selected next using the Rectangle Tool on the toolbar. Subsequently, Threshold is selected from Adjust in the Image menu, and a brightness threshold value (0 to 153 (256 gradations; reference value)) is designated so that there is selected only the region (release agent exposed portion) not stained with ruthenium, from among the backscattered electrons. Lastly, Measure is selected from the Analyze menu, to calculate the value of the area ratio (area %) of a brightness selection portion in the backscattered electron image.

The above procedure is performed for 20 fields of view of the toner particle to be evaluated, and then the arithmetic mean value of the results is taken as the abundance Sw of the release agent on the surface of the toner particle.

Measurement of the Content of the Release Agent

The binder resin and the release agent component are separated from the toner particle in accordance with the above-described method for separating the release agent component from the toner. The binder resin and release agent obtained through separation are dried and solidified, and the respective weights of the foregoing are measured, to work out the content of the release agent relative to 100 parts by mass of the toner particle.

Method for Measuring the Number-Average Particle Diameter of Primary Particles of the Silica Fine Particle The number-average particle diameter of the silica fine particle is measured by identifying the silica fine particle from a secondary electron image and a backscattered electron image at a same position, acquired through scanning electron microscope (SEM) observation of the toner surface.

Method for Acquiring a Secondary Electron Image and a Backscattered Electron Image of Toner Device used: ULTRA PLUS by Carl Zeiss Microscopy GmbH Accelerating voltage: 1.0 kV WD: 2.5 mm Aperture size: 30.0 μm Detection signal: SE2 (secondary electron) EsB (energy-selective backscattered electron)

EsB Grid: 700 V

Observation magnifications: 50,000 magnifications

Backscattered electron image contrast: 63.0±5.0% (reference value)

Backscattered electron image brightness: 38.0±5.0% (reference value)

Resolution: 1024×768 pixels

Pretreatment: toner sprinkled on carbon tape (without Pt vapor deposition)

The major axis of 100 primary particles of the silica fine particle on the surface of the toner particle is measured from the obtained secondary electron image, and the arithmetic mean value of the measured values is taken as the number-average particle diameter of the silica particle. The silica fine particle and the strontium titanate fine particle are distinguished by analyzing a backscattered electron image of the outermost surface of the toner, obtained in accordance with the above method, utilizing image processing software ImageJ (developed by Wayne Rashand). The procedure involved is as follows.

Firstly, the backscattered electron image to be analyzed is converted to an 8-bit image, from Type in the Image menu. Then, through Filters in the Process menu, the Median diameter is set to 2.0 pixels, to reduce image noise. The entire backscattered electron image is selected next using the Rectangle Tool on the toolbar. Subsequently, Threshold is selected from Adjust in the Image menu; herein particles for which the brightness threshold value from among the backscattered electrons is from 105 to 155 (reference value) are a silica fine particle, whereas particles for which the brightness threshold value is from 156 to 255 (reference value) are a strontium titanate fine particle.

Method for Measuring the C Amount of a Silica Fine Particle

The C amount (carbon amount) derived from the hydrophobizing agent for a silica fine particle is measured using a carbon/sulfur analyzer (product name: EMIA-320) by HORIBA Ltd. Herein 0.3 g of a silica fine particle as a sample is weighed exactly and is placed in a crucible of the above carbon/sulfur analyzer. To the crucible there are added 0.3 g±0.05 g of tin (supplementary item number 9052012500) and 1.5 g±0.1 g of tungsten (supplementary item number 9051104100), as combustion improvers. Thereafter, the silica fine particle is heated at 1100° C. in an oxygen atmosphere, according to the instruction manual ancillary to the carbon/sulfur analyzer. As a result, hydrophobic groups derived from the hydrophobizing agent on the surface of the silica fine particle become thermally decomposed into $CO_2$, and the amount of the resulting $CO_2$ is measured. The amount of C (mass %) contained in the silica fine particle is worked out from the amount of $CO_2$ thus obtained.

Calculation of C Amount Immobilization Rate of Silica Fine Particle Washing with Chloroform: Extraction of Non-Immobilized Treatment Agent A silica fine particle separated from the toner by the method for separating a silica fine particle from the toner surface described above can be used. A total of 0.50 g of silica fine particles and 40 mL of chloroform are placed into an Erlenmeyer flask, covered with a lid, and stirred (magnetic stirrer, 300 rpm) for 2 h. After that, the stirring is stopped, and the mixture is allowed to stand for 12 h. Then centrifuging is performed, and the entire supernatant is removed. A centrifuge manufactured by Kokusan Corp. (trade name: H-9R) is used, the centrifugation is performed using a Bn1 rotor and a plastic centrifuge tube for the Bn1 rotor and under the conditions of 20° C., 10000 rpm, and 5 min.

The centrifuged silica fine particle is placed into the Erlenmeyer flask again, 40 mL of chloroform is added, a lid is placed, and stirring is performed (magnetic stirrer, 300 rpm) for 2 h. After that, the stirring is stopped, and the mixture is allowed to stand for 12 h. Then centrifuging is performed to remove all supernatant. This operation is repeated two more times. Then, the obtained sample is dried at 50° C. for 2 h using a thermostat. Further, chloroform is sufficiently volatilized by reducing the pressure to 0.07 MPa and drying at 50° C. for 24 h.

Measurement of C Amount

The C amount in the silica fine particle washed with chloroform as described above and the C amount in the silica fine particle before washing with chloroform are measured according to the above "Method for Measuring C Amount in Silica Fine Particle". The C amount immobilization rate of the silica fine particle can be calculated by the following formula.

$$\text{C amount immobilization rate [\%]} = [(\text{C amount in silica fine particle treated with chloroform})/(\text{C amount in silica fine particle before washing with chloroform})] \times 100$$

Method for Measuring the Value of the Element Intensity-Basis Ratio of the Content of the Silica Fine Particle Relative to the Content of the Strontium Titanate Fine Particle on the Surface of the Toner Particle The value (Si/Sr) of the element intensity-basis ratio of the content of the silica fine particle relative to the content of the strontium titanate fine particle on the surface of the toner particle can be calculated on the basis of a measurement by X-ray fluorescence analysis (XRF). The toner is pelletized by press molding, described below, to yield a sample; Si atoms contained in the silica fine particle and Sr atoms specific to the strontium titanate fine particle that are to be analyzed are then quantified using the below-described wavelength-dispersive X-ray fluorescence analyzer.

(i) Example of the Device Used

X-ray fluorescence analyzer 3080 (by Rigaku Corporation)

(ii) Sample Preparation

A sample press molding machine by Maekawa Testing Machine Mfg. Co., Ltd. is used for sample preparation. An aluminum ring (model number: 3481E1) is packed with 0.5 g of toner, and the toner is pelletized through pressing for 1 min under a load set to 5.0 tons.

(iii) Measurement Conditions

Measurement diameter: 10φ

Measurement potential, voltage 50 kV, 50 to 70 mA

2θ angle 25.12° crystal plate LiF

Measurement time 60 seconds (iv) Calculation of a Si Element Intensity Ratio Corresponding to Si Atoms Contained in the Silica Fine Particle An identical measurement is performed on the toner particle resulting from separation of the silica fine particle from the surface of the toner in accordance with the above-described method, for the purpose of calculating the ratio of Si element intensity corresponding to the Si atoms contained in the silica fine particle, in the Si element intensity of the toner to be analyzed. The Si element intensity corresponding to the Si atoms contained in the silica fine particle can be calculated on the basis of the expression below, from the measured Si element intensity before silica separation and the measured Si element intensity after silica separation.

(Si element intensity ratio corresponding to Si atoms contained in silica fine particle)=(Si element intensity before silica separation−Si element intensity after silica separation)/(Si element intensity before silica separation)

(v) Calculation of Si/Sr

Si/Sr=(Si element intensity before silica separation× Si element intensity corresponding to Si atoms contained in silica fine particle/Sr element intensity before silica separation)

Method for Measuring Weight-Average Particle Diameter (D4) of Toner

The weight-average particle diameter (D4) of the toner is calculated by using a precision particle diameter distribution measuring device "Coulter Counter Multisizer 3" (registered trademark, manufactured by Beckman Coulter, Inc.), which is based on a pore electrical resistance method and equipped with a 100 μm aperture tube, and dedicated software "Beckman Coulter Multisizer 3 Version 3.51" (manufactured by Beckman Coulter, Inc.) provided therewith for setting measurement conditions and analyzing the measurement data, performing measurements at the number of effective measurement channels of 25,000 and analyzing the measurement data. For the electrolytic aqueous solution used for measurement, a solution in which special grade sodium chloride is dissolved in ion-exchanged water so that the concentration is about 1% by mass, for example, "ISOTON II" (manufactured by Beckman Coulter, Inc.) can be used. Before performing the measurement and analysis, the dedicated software is set as follows.

At the "Change Standard Measurement Method (SOM) Screen" of the dedicated software, the total number of counts in control mode is set to 50,000 particles, the number of measurements is set to 1, and a value obtained using "Standard Particle 10.0 μm" (manufactured by Beckman Coulter Co., Ltd.) is set as the Kd value. The threshold and noise level are automatically set by pressing the threshold/noise level measurement button. Also, the current is set to 1600 μA, the gain is set to 2, the electrolytic solution is set to ISOTON II, and the flash of aperture tube after measurement is checked. At the "Pulse to Particle Diameter Conversion Setting Screen" of the dedicated software, the bin interval is set to logarithmic particle diameter, the particle diameter bin is set to a 256 particle diameter bin, and the particle diameter range is set to from 2 μm to 60 μm.

The specific measurement method is as follows.

(1) About 200 ml of the electrolytic aqueous solution is placed in a 250 ml round-bottom glass beaker exclusively provided for Multisizer 3, the beaker is set on a sample stand, and a stirrer rod is stirred counterclockwise at 24 revolutions/second. Then, the dirt and air bubbles inside the aperture tube are removed using the "Flush Aperture Tube" function of the dedicated software.

(2) About 30 ml of the electrolytic aqueous solution is placed in a 100 ml flat-bottomed glass beaker, and about 0.3 ml of a diluent obtained by 3-fold by mass dilution of "CONTAMINON N" (a 10% by mass aqueous solution of a neutral detergent for washing precision measuring instruments at pH 7, which consists of a nonionic surfactant, an anionic surfactant, and an organic builder, manufactured by Wako Pure Chemical Industries, Ltd.) as a dispersing agent with ion-exchanged water is added thereto.

(3) A predetermined amount of ion-exchanged water is placed in a water tank of an ultrasonic disperser "Ultrasonic Dispersion System Tetora 150" (manufactured by Nikkaki Bios Co., Ltd.) having an electrical output of 120 W and containing two oscillators with an oscillation frequency of 50 kHz that are built in with a phase shift of 180 degrees, and about 2 ml of the CONTAMINON N is added to the water tank.

(4) The beaker of (2) is set in the beaker fixing hole of the ultrasonic disperser and the ultrasonic disperser is operated. The height position of the beaker is adjusted so that the resonance state of the liquid level of the electrolytic aqueous solution in the beaker is maximized.

(5) While the electrolytic aqueous solution in the beaker in (4) above is being irradiated with ultrasonic waves, about 10 mg of toner is added little by little to the electrolytic aqueous solution and dispersed. Then, the ultrasonic dispersion treatment is continued for another 60 sec. In the ultrasonic dispersion, the temperature of water in the water tank is appropriately adjusted to from 10° C. to 40° C.

(6) The electrolytic aqueous solution of (5) in which the toner is dispersed is dropped using a pipette into the round-bottomed beaker of (1) installed in the sample stand, and the measured concentration is adjusted to about 5%. The measurement is continued until the number of measured particles reaches 50,000.

(7) The measurement data are analyzed with the dedicated software provided with the device, and the weight-average particle diameter (D4) is calculated. The weight-average particle diameter (D4) is the "average diameter" on the analysis/volume statistics (arithmetic mean) screen when graph/vol % is set using the dedicated software.

EXAMPLES

Although the present disclosure will be described in more detail below with production examples and examples, these are not intended to limit the present disclosure in any way. All parts in the following formulations are parts by mass.

Production Example of Silica Fine Particle 1

Untreated dry silica (number-average particle diameter of primary particles: 15 nm, BET specific surface area: 200 $m^2/g$) as small-diameter inorganic fine particles and untreated dry silica (number-average particle diameter of primary particles: 35 nm, BET specific surface area: 50 $m^2/g$) as large-diameter inorganic fine particles were inputted, at a mass ratio of 10:1, and were heated at 330° C. in a fluidized state elicited by stirring. The interior of the reactor was replaced with nitrogen gas, the reactor was sealed, and octamethylcyclotetrasiloxane as a first surface treatment agent was sprayed into the reactor using a spray nozzle, so that the partial pressure within the reactor was 200 kPa, to be mixed with 100 parts of the base material silica. A coating treatment was carried out thereafter through continued heating and stirring for 1 hour.

After the treatment, the interior of the reaction system was replaced with a nitrogen atmosphere and was heated to 330° C. once more. Next, 100 parts of the untreated dry silica were sprayed with 10 parts of dimethyl silicone oil (KF-96-50CS by Shin-Etsu Chemical Co., Ltd.) as a second surface treatment agent, with a similar coating treatment being then carried out for 1 hour, to thereby yield Silica fine particle 1. Table 1-1 sets out physical property values of Silica fine particle 1.

Production Examples of Silica Fine Particles 2 to 6

Silica fine particles 2 to 6 were obtained in the same way as in the production example of Silica fine particle 1, but herein the reaction time of the first surface treatment agent, the number of parts of the second surface treatment agent, and the treatment temperature of the first surface treatment agent and of the second surface treatment agent were modified as given in Table 1-1. Table 1-2 sets out physical property values of Silica fine particles 2 to 6. The structure of the substituent of the compound represented by Formula (3) is given as the structure of the second treatment component in Table 1-1.

Production Example of Silica Fine Particle 7

Silica fine particle 7 was obtained in the same way as in the production example of Silica fine particle 1, but herein untreated dry silica (number-average particle diameter of primary particles: 15 nm, BET specific surface area: 200 $m^2/g$) as small-diameter inorganic fine particles and untreated dry silica (number-average particle diameter of primary particles: 55 nm, BET specific surface area: 40 $m^2/g$) as large-diameter inorganic fine particles, were inputted, at a mass ratio of 1:6. Table 1-2 sets out physical property values of Silica fine particle 7.

Production Example of Silica Fine Particle 8

Silica fine particle 8 was obtained in the same way as in the production example of Silica fine particle 1, but herein there was inputted only untreated dry silica (number-average particle diameter of primary particles: 5 nm, BET specific surface area: 300 $m^2/g$) as inorganic fine particles. Table 1-2 sets out physical property values of Silica fine particle 8.

Production Examples of Silica Fine Particles 9 and 10

Silica fine particles 9 and 10 were obtained by carrying out a treatment operation similar to that of the production example of Silica fine particle 1, but herein there was inputted only untreated dry silica (number-average particle diameter of primary particles: 6 nm, BET specific surface area: 300 $m^2/g$) as inorganic fine particles, both-end carbinol-modified silicone oil (KF-6002 by Shin-Etsu Chemical Co., Ltd.) was used as the second surface treatment agent, and the number of treated parts was as given in Table 1. Table 1-2 sets out physical property values of Silica fine particles 9 and 10.

Production Example of Silica Fine Particle 11

Untreated dry silica (number-average particle diameter of primary particles: 25 nm, BET specific surface area: 150 $m^2/g$) as inorganic fine particles was inputted and was heated to 290° C. in a fluidized state elicited by stirring. The interior of the reactor was replaced with nitrogen gas, the reactor was sealed, and octamethylcyclotetrasiloxane as the first surface treatment agent was sprayed in and mixed, using a spray nozzle, until the gauge pressure reached 100 kPa. Thereafter, the reaction was conducted through continued heating and stirring for 1 hour, to perform a coating treatment.

After the treatment, the interior of the reaction system was replaced with a nitrogen atmosphere, with heating once more at 290° C. Next, 100 parts of the untreated dry silica were sprayed with 15 parts of dimethyl silicone oil (KF-96-50CS by Shin-Etsu Chemical Co., Ltd.) as a second surface treatment agent, with a similar coating treatment being then carried out for 1 hour, to thereby yield Silica fine particle 11. Table 1-2 sets out physical property values of Silica fine particle 11.

Production Example of Silica Fine Particle 12

Untreated dry silica (number-average particle diameter of primary particles: 25 nm, BET specific surface area: 150 $m^2/g$) as inorganic fine particles was inputted and was heated to 250° C. in a fluidized state elicited by stirring. The interior of the reactor was replaced with nitrogen gas, the reactor was sealed, and octamethylcyclotetrasiloxane as the first surface treatment agent was sprayed in and mixed, using a spray nozzle, until the gauge pressure reached 100 kPa. Thereafter, the reaction was conducted through continued heating and stirring for 1 hour, to perform a coating treatment, and yield Silica fine particle 12. Table 1-2 sets out physical property values of Silica fine particle 12.

Production Example of Silica Fine Particle 13

Untreated dry silica (number-average particle diameter of primary particles: 25 nm, BET specific surface area: 150 $m^2/g$) as inorganic fine particles was inputted and was heated to 250° C. in a fluidized state elicited by stirring. The interior of the reactor was replaced with nitrogen gas, the reactor was sealed, and the silica was kept in a fluid state through continued stirring and heat retention; thereupon, 100 parts of the untreated dry silica were sprayed with 30 parts of dimethyl silicone oil (KF-96-50CS by Shin-Etsu Chemical Co., Ltd.), with a coating treatment being then carried out for 1 hour, to thereby yield Silica fine particle 13. Table 1-2 sets out physical property values of Silica fine particle 13.

Production Example of Silica Fine Particle 14

Silica fine particle 14 was obtained in the same way as in the production example of Silica fine particle 13, but herein the number of parts of dimethyl silicone oil was modified as given in Table 1-1. Table 1-2 sets out physical property values of Silica fine particle 14.

Production Example of Silica Fine Particle 15

Untreated dry silica (number-average particle diameter of primary particles: 30 nm, BET specific surface area: 110 $m^2/g$) as inorganic fine particles was inputted and was heated to 300° C. in a fluidized state elicited by stirring. The interior of the reactor was replaced with nitrogen gas, the reactor was sealed, and the silica was kept in a fluid state through continued stirring and heat retention; thereupon, a solution resulting from diluting 20 parts of modified polydimethylsiloxane having a hydroxyl group at the terminus with 100 parts of hexane were added, and the silica was treated for 2 hours, while being continuity stirred, to yield Silica fine particle 15. Table 1-2 sets out physical property values of Silica fine particle 15.

Production Example of Silica Fine Particle 16

Untreated dry silica (number-average particle diameter of primary particles: 25 nm, BET specific surface area: 150 $m^2/g$) as inorganic fine particles was inputted and was heated to 250° C. in a fluidized state elicited by stirring. The interior of the reactor was replaced with nitrogen gas, the reactor was sealed, and 100 parts of the untreated dry silica were sprayed with 25 parts of hexamethyldisilazane, as the first surface treatment agent, using a spray nozzle. Thereafter, a coating treatment was carried out by allowing the reaction to proceed, with heating and stirring for 1 hour.

After the treatment, the interior of the reaction system was replaced with a nitrogen atmosphere, with heating once more at 250° C. Next, 100 parts of the untreated dry silica were sprayed with 10 parts of dimethyl silicone oil (KF-96-50CS by Shin-Etsu Chemical Co., Ltd.) as a second surface treatment agent, with a similar coating treatment being then carried out for 1 hour, to thereby yield Silica fine particle 16. Table 1-2 sets out physical property values of Silica fine particle 16.

Production Example of Silica Fine Particle 17

Untreated dry silica (number-average particle diameter of primary particles: 25 nm, BET specific surface area: 150 $m^2/g$) as inorganic fine particles was inputted and was heated to 250° C. in a fluidized state elicited by stirring. The interior of the reactor was replaced with nitrogen gas, the reactor was sealed, and 100 parts of the untreated dry silica were sprayed with 25 parts of hexamethyldisilazane, as the first surface treatment agent, using a spray nozzle. Thereafter, the reaction was conducted through continued heating and stirring for 1 hour, to perform a coating treatment, and yield Silica fine particle 17. Table 1-2 sets out physical property values of Silica fine particle 17.

Production Example of Magnetic Body 1

Into a ferrous sulfate aqueous solution there were mixed 1.05 equivalents, relative to iron, of a caustic soda solution, $P_2O_5$ in an amount of 0.15 mass % on a phosphorus basis relative to iron, and $SiO_2$ in an amount of 1.50 mass % on a silicon basis relative to iron, to prepare an aqueous solution containing ferrous hydroxide. With 8.0 as the pH of the aqueous solution, an oxidation reaction was carried out at 85° C. while air was blown into the aqueous solution, to prepare a slurry liquid having seed crystals.

Next, a ferrous sulfate aqueous solution was added to this slurry liquid, to an amount of 1.05 equivalents relative to the initial alkali amount (sodium component of caustic soda), after which the slurry liquid was maintained at pH 7.6, and an oxidation reaction was carried out while under blow-in of air, to yield a slurry liquid that contained magnetic iron oxide particles. The produced magnetic iron oxide particles were filtered using a filter press, were washed with a large amount of water, and were thereafter dried at 120° C. for 2 hours, to yield particles that were thereupon subjected to a deagglomeration treatment, to yield Magnetic body 1 having a number-average particle diameter of 150 nm.

Production Example of Toner Particle 1

Binder resin 100.0 parts (Amorphous PES resin; amorphous polyester resin resulting from a condensation reaction of ethylene oxide and propylene oxide adducts of bisphenol A and terephthalic acid; Mw=9500, Tg=58° C.)

Magnetic body 1 95.0 parts

Release agent Fischer-Tropsch wax 5.5 parts (C105, by Sasol Limited, melting point 105° C.)

Iron complex of monoazo dye (T-77: by Hodogaya Chemical Co., Ltd.) 2.0 parts

The above starting materials were premixed using a Henschel mixer FM10C (by Mitsui Miike Engineering Corporation). This was followed by kneading using a twin-screw kneading extruder (PCM-30 by Ikegai Corp) set to a rotational speed of 250 rpm, and with a set temperature adjusted so that direct temperature in the vicinity of the outlet of the kneaded product was 145° C. The obtained melt-kneaded product was cooled, and the cooled melt-kneaded product was coarsely pulverized using a cutter mill. Thereafter, the obtained coarsely pulverized product was finely pulverized using Turbo Mill T-250 (by Turbo Kogyo Co., Ltd.), with a feed amount set to 25 kg/hr, and with air temperature adjusted so that the discharge temperature was 38° C.; this was followed by classification using a multi-grade classifier relying on the Coanda effect. As a result there was obtained Toner particle 1 having a weight-average particle diameter (D4) of 7.6 μm. Table 2 sets out physical property values of Toner particle 1. Production Examples of Toner Particles 2 to 6

Toner particles 2 to 6 were obtained by carrying out an operation similar to that of the production method of Toner particle 1, but herein the amount of release agent was modified to the conditions given in Table 2. Table 2 sets out physical property values of Toner particles 2 to 6.

Production Examples of Toner Particles 7 to 9

Toner particles 7 to 9 were obtained by carrying out an operation similar to that of the production method of Toner particle 1, but herein the release agent species was modified to carnauba wax (by Nippon Seiro Co., Ltd., melting point 83° C.), and the amount of release agent was modified to the conditions given in Table 2. Table 2 sets out physical property values of Toner particles 7 to 9.

Production Example of Toner Particle 10

Toner particle 10 having a weight-average particle diameter (D4) of 7.5 μm was obtained by carrying out an operation similar to that of the production method of Toner particle 9, but herein the binder resin species was modified to a styrene/n-butyl acrylate copolymer (styrene acrylic resin having a mass ratio of 78:22 of styrene and n-butyl acrylate; Mw=8500, Tg=58° C.). Table 2 sets out physical property values of Toner particle 10.

Production Example of Toner Particle 11

Toner particle 11 having a weight-average particle diameter (D4) of 7.5 μm was obtained by carrying out a treatment operation similar to that of the production method of Toner particle 3, but herein the binder resin species was modified to a styrene/n-butyl acrylate copolymer (styrene acrylic resin having a mass ratio of 78:22 of styrene and n-butyl acrylate; Mw=8500, Tg=58° C.). Table 2 sets out physical property values of Toner particle 11.

Production Example of Toner Particle 12

Toner particle 12 was produced by emulsion aggregation in accordance with the following procedure.

Production of Binder Resin Particle Dispersion 1

Herein 89.5 parts of styrene, 9.2 parts of butyl acrylate, 1.3 parts of acrylic acid and 3.2 parts of n-lauryl mercaptan were mixed and dissolved. An aqueous solution resulting from mixing 1.5 parts of Neogen RK (by Daiichi Kogyo Seiyaku Co., Ltd.) with 150 parts of ion-exchanged water was added to the mixed solution, to elicit dispersion. An aqueous solution obtained by mixing 0.3 parts of potassium persulfate with 10 parts of ion-exchanged water was further added while under slow stirring for 10 minutes. After replacement with nitrogen, emulsion polymerization was carried out at 70° C. for 6 hours. Once polymerization was over, the reaction solution was thereafter cooled down to room temperature, and ion-exchanged water was added, to yield Binder resin particle dispersion 1 having a solids concentration of 12.5 mass % and a volume-basis median diameter of 0.2 μm.

Production Example of Release Agent Dispersion 1

Herein 100 parts of a release agent (Fischer-Tropsch, melting point: 105° C.) and 15 parts of Neogen RK were mixed with 385 parts of ion-exchanged water, with dispersion for about 1 hour using a wet-type jet mill JN100 (by Jokoh K K), to yield Release agent dispersion 1. The solids concentration of Release agent dispersion 1 was 20 mass %.

Production Example of Magnetic Iron Oxide Dispersion 1

Herein 100 parts of magnetic iron oxide particles and 10.0 parts of Neogen SC were mixed with 890 parts of ion-exchanged water, with dispersion for 1 hour using a wet-type jet mill JN100, to yield Magnetic iron oxide dispersion 1.

Production Example of Toner Particle Dispersion 1

Herein 265 parts of Binder resin particle dispersion 1, plus 10 parts of Release agent dispersion 1 and 65 parts of Magnetic iron oxide dispersion 1 were charged into a vessel and were dispersed using a homogenizer (by IKA-Werke Gmbh & Co. KG: Ultra Turrax T50). The temperature in the vessel was adjusted to 30° C. while under stirring, and 1 mol/L hydrochloric acid was added to adjust pH to 5.0. After standing for 3 minutes, warming was initiated, to cause the temperature to rise up to 50° C., and elicit formation of aggregated particles. The particle diameter of the aggregated particles was measured, in this state, using "Coulter Counter Multisizer 3" (registered trademark, by Beckman Coulter, Inc.). Once the weight-average particle diameter of the aggregated particles reached 6.2 μm, a 1 mol/L aqueous solution of sodium hydroxide was added, to adjust pH to 8.0 and stop particle growth. Thereafter, the temperature was raised to 95° C., to elicit to fusion and spheroidizing of the aggregated particles. Cooling was initiated at the point in time where average circularity reached 0.980, and the temperature was then lowered down to 30° C., to yield Toner particle dispersion 1.

Hydrochloric acid was added to the obtained Toner particle dispersion 1, to adjust pH to 1.5 or less. Thereafter, the dispersion was allowed to stand while under stirring for 1 hour, and solid-liquid separation was then performed using a pressure filter, to yield a toner cake. The toner cake was re-slurried with ion-exchanged water to yield a dispersion once more, after which solid-liquid separation was performed using the above-described filter. Re-slurrying and solid-liquid separation were repeated until the electrical conductivity of the filtrate reached 5.0 uS/cm or less, after which a toner cake was ultimately obtained in a final solid-liquid separation.

The obtained toner cake was dried in a Flash Jet Dryer (by Seishin Enterprise Co., Ltd.). The drying conditions involved a blow-in temperature set to 90° C. and a dryer outlet temperature set to 40° C. The supply rate of the toner cake was adjusted in accordance with the moisture content of the toner cake so that the outlet temperature did not deviate from 40° C. Fine and coarse powders were cut using a multi-grade classifier relying on the Coanda effect, to yield Toner particle 12. The weight-average particle diameter (D4) of Toner particle 12 was 8.4 μm, and the glass transition temperature (Tg) was 57° C. Table 2 sets out the physical properties of Toner particle 12.

Production Example of Toner 1

Herein 100 parts of Toner particle 1, plus 1.4 parts of Silica fine particle 1 and 0.2 parts of a strontium titanate fine particle (number-average particle diameter 1.2 μm) were charged into an FM mixer ("FM-10B" by Nippon Coke & Engineering Co., Ltd.), and were mixed for 180 seconds at a rotational speed of 3500 rpm, to yield a toner mixture. Coarse particles were then removed using a sieve having a 300 mesh (48 μm mesh opening), to yield Toner 1. Table 3 sets out production conditions and physical properties.

Production Examples of Toners 2 to 31

Toners 2 to 32 were obtained by carrying out an operation similar to that of the production example of Toner 1, but herein the types of toner particle and silica fine particle, the number of parts of added silica fine particle, the number of parts of added strontium titanate fine particle and external addition conditions of Toner 1 were modified as given in Table 3. Table 3 sets out production conditions and physical properties.

Example 1

The following evaluations were carried out using the obtained Toner 1.

Test

In anticipation of evaluation of fixing performance in a high-speed machine, HP LaserJet Enterprise M609dn modified to a process speed of 500 mm/see was used herein. The machine was also modified through further connection of an external power supply, so as to modify transfer bias, and then charge quantity, charging stability, fogging and trailing edge offset were evaluated. Evaluation results are given in Table 4.

(1) Evaluation of Charge Quantity and Charging Stability

The above image output tester and a toner cartridge filled with evaluation toner were allowed to stand in a high-temperature, high-humidity environment at 32.5° C./80% RH, for one day or longer, after which there were outputted 20,000 prints of a horizontal line pattern in which 4-dot horizontal lines were printed at 176-dot intervals, in the image output tester. The charge quantity (μC/g) of the toner on a developing carrier within the toner cartridge was measured, after output of the initial 10 prints and after output of 20,000 prints in the above test, using a blow-off powder charge quantity measuring device TB-200 (by Toshiba Chemical Corporation), and charging performance and charging stability in a high-temperature, high-humidity environment were evaluated. The larger the numerical value of charging performance, the higher is the charging performance, and the smaller the difference between the initial charge quantity and the charge quantity after output of 20,000 prints, the better is the charging stability of the toner. Evaluation ranks of charge quantity and charging stability to be evaluated were established as follows.

Evaluation Criteria

Charge Quantity

A: Charge quantity is smaller than −30.0 μC/g

B: Charge quantity is-30.0 μC/g or more and less than −27.5 μC/g

C: Charge quantity is-27.5 μC/g or more and less than −25.0 μC/g

D: Charge quantity is-25.0 μC/g or more and less than −22.5 μC/g

E: Charge quantity is-22.5 μC/g or more

Charging Stability

Difference in charge quantity between an initial stage and after output of 20,000 prints is:

A: less than −2.0 μC/g

B: −2.0 μC/g or more and less than −4.0 μC/g

C: From −4.0 μC/g or more and less than −6.0 μC/g

D: From −6.0 μC/g or more and less than −8.0 μC/g

E: −8.0 μC/g or more (2) Fogging Evaluation

Fogging was evaluated on the basis of a comparison between the whiteness of transfer paper and the whiteness of a solid white image after a test of 20,000 outputted prints in a high-temperature, high-humidity environment at 32.5° C./80% RH, as measured using a reflection densitometer (Reflectometer model TC-6DS by Tokyo Denshoku Co., Ltd.). The smaller the numerical value of fogging, the better is the fogging suppression effect denoted thereby.

A: Fogging density is less than 1.0%

B: Fogging density is 1.0% or more and less than 2.0%

C: Fogging density is 2.0% or more and less than 3.0%

D: Fogging density is 3.0% or more (3) Evaluation of Trailing Edge Offset

Using the above image reproduction tester, the setting of the fixing unit thereof was modified so that the temperature control of the fixing unit was lowered by 10° C. The fixing unit was removed between evaluations in a high-temperature, high-humidity environment (32.5° C./80% RH), and the following evaluations were performed in a state in which the fixing unit was sufficiently cooled using for instance an electric fan. By sufficiently cooling the fixing unit after evaluation, the temperature of a fixing nip portion, having risen after image output, is lowered, thereby making it possible to evaluate the toner fixing performance rigorously and with good reproducibility.

To evaluate trailing edge offset, A4 size OceRedLabel paper by Canon Inc. (basis weight: 80 g/m$^2$) used as a recording material was allowed to stand in a high-temperature, high-humidity environment for 48 hours or longer. Trailing edge offset can be evaluated rigorously by using paper that is comparatively heavy and has significant surface roughness, and using also paper having been allowed to stand in a high-temperature, high-humidity environment (standing paper). In the present evaluation, a solid black image was outputted on the standing paper, with the fixing unit in a state of having cooled sufficiently. The laid-on level of toner on the paper was adjusted herein to be 9 g/m$^2$. As a determination criterion of trailing edge offset, an offset level was visually evaluated in the solid black image having been outputted according to the above procedure. Determination criteria were as follows.

A: No offset at all

B: Some offset visible when looked at closely

C: Offset visible but not noticeably so

D: Conspicuous offset

Examples 2 to 23

Evaluations were performed in the same way as in Example 1, but using herein Toners 2 to 23.

Comparative Examples 1 to 8

Evaluations were performed in the same way as in Example 1, but using herein Toners 24 to 31.

TABLE 1-1

| Silica fine particle No. | Substrate BET/m$^2$/g | First treatment component: Treatment agent | First treatment component: Use amount/kPa (for HMDS, number of parts) | First treatment component: Reaction time/h | Second treatment component: Terminus R1 structure | Second treatment component: Terminus R2 structure | Second treatment component: m | Second treatment component: Treated parts | Treatment temperature ° C. |
|---|---|---|---|---|---|---|---|---|---|
| 1 | 200 50 (10:1) | D4 | 200 | 1 | Methyl group | Methyl group | 101 | 10 | 330° C. |
| 2 | 200 50 (10:1) | D4 | 200 | 2 | Methyl group | Methyl group | 101 | 12 | 330° C. |

TABLE 1-1-continued

| Silica fine particle No. | Substrate BET/ $m^2/g$ | First treatment component: Treatment agent | First treatment component: Use amount/kPa (for HMDS, number of parts) | First treatment component: Reaction time/h | Second treatment component: Terminus R1 structure | Second treatment component: Terminus R2 structure | Second treatment component: m | Second treatment component: Treated parts | Treatment temperature ° C. |
|---|---|---|---|---|---|---|---|---|---|
| 3 | 200 50 (10:1) | D4 | 200 | 3 | Methyl group | Methyl group | 101 | 10 | 330° C. |
| 4 | 200 50 (10:1) | D4 | 200 | 1 | Methyl group | Methyl group | 101 | 12 | 300° C. |
| 5 | 200 50 (10:1) | D4 | 200 | 2 | Methyl group | Methyl group | 101 | 8 | 330° C. |
| 6 | 200 50 (10:1) | D4 | 200 | 1 | Methyl group | Methyl group | 101 | 8 | 330° C. |
| 7 | 200 40 (1:6) | D4 | 200 | 1 | Methyl group | Methyl group | 101 | 9 | 330° C. |
| 8 | 300 | D4 | 200 | 1 | Methyl group | Methyl group | 101 | 11 | 330° C. |
| 9 | 300 | D4 | 200 | 1 | Carbinol group | Carbinol group | 93 | 11 | 330° C. |
| 10 | 300 | D4 | 200 | 1 | Carbinol group | Carbinol group | 93 | 10 | 330° C. |
| 11 | 150 | D4 | 100 | 1 | Methyl group | Methyl group | 101 | 15 | 290° C. |
| 12 | 150 | D4 | 100 | 1 | — | — | — | — | 250° C. |
| 13 | 150 | — | — | — | Methyl group | Methyl group | 101 | 30 | 250° C. |
| 14 | 150 | — | — | — | Methyl group | Methyl group | 101 | 20 | 250° C. |
| 15 | 110 | — | — | — | Hydroxy group | Hydroxy group | 100 | 15 | 250° C. |
| 16 | 150 | HMDS | 25 | 1 | Methyl group | Methyl group | 101 | 10 | 250° C. |
| 17 | 150 | HMDS | 25 | 1 | — | — | — | — | 250° C. |

In Silica fine particles 1 to 6 the column of substrate BET/$m^2/g$ in Table 1-1 indicates that a small-diameter silica fine particle, having a BET specific surface area of 200 $m^2/g$, and a large-diameter silica fine particle, having a BET specific surface area of 50 $m^2/g$, were used at a mass ratio of small-particle diameter silica: large-diameter silica of 10:1 (in Silica fine particle 7, ratio 1:6 of small-particle diameter silica having a BET specific surface area of 200 $m^2/g$ relative to the large-diameter silica having a BET specific surface area of 40 $m^2/g$). D4 represents octamethylcyclotetrasiloxane. The use amount column denotes parts of HMDS (hexamethyldisilazane).

TABLE 1-2

| Silica fine particle No. | D/S | B | D/S/B before washing | D/S/B after washing | D1/D | Sn | C amount immobilization rate/% | Number-average particle diameter/nm | X/Y |
|---|---|---|---|---|---|---|---|---|---|
| 1 | 0.18 | 120 | 1.5E−03 | 9.5E−04 | 0.20 | 0.15 | 63 | 25 | 0.75 |
| 2 | 0.22 | 120 | 1.8E−03 | 1.0E−03 | 0.18 | 0.10 | 57 | 25 | 0.71 |
| 3 | 0.21 | 120 | 1.8E−03 | 1.1E−03 | 0.27 | 0.05 | 60 | 25 | 1.00 |
| 4 | 0.21 | 120 | 1.8E−03 | 1.1E−03 | 0.10 | 0.13 | 61 | 25 | 0.62 |
| 5 | 0.17 | 120 | 1.4E−03 | 9.1E−04 | 0.30 | 0.16 | 64 | 25 | 1.15 |
| 6 | 0.12 | 120 | 1.0E−03 | 6.5E−04 | 0.27 | 0.20 | 65 | 25 | 1.05 |
| 7 | 0.13 | 55 | 2.4E−03 | 1.5E−03 | 0.25 | 0.17 | 62 | 50 | 0.85 |
| 8 | 0.21 | 230 | 9.1E−04 | 6.1E−04 | 0.15 | 0.15 | 67 | 5 | 0.71 |
| 9 | 0.22 | 230 | 9.6E−04 | 6.6E−04 | 0.15 | 0.15 | 69 | 6 | 0.73 |
| 10 | 0.20 | 230 | 8.7E−04 | 6.3E−04 | 0.20 | 0.08 | 73 | 6 | 0.79 |
| 11 | 0.22 | 100 | 2.2E−03 | 1.2E−03 | 0.28 | 0.21 | 55 | 21 | 0.25 |
| 12 | 0.15 | 130 | 1.2E−03 | 9.2E−04 | 0.40 | 0.30 | 80 | 21 | — |
| 13 | 0.30 | 60 | 5.0E−03 | 3.3E−03 | 0.32 | 0.20 | 65 | 21 | — |
| 14 | 0.20 | 90 | 2.2E−03 | 1.6E−03 | 0.30 | 0.26 | 70 | 22 | — |
| 15 | 0.23 | 46 | 5.0E−03 | 4.2E−03 | 0.17 | 0.18 | 83 | 35 | — |
| 16 | 0.15 | 110 | 1.4E−03 | 8.2E−04 | 0.00 | 0.10 | 60 | 21 | — |
| 17 | 0.00 | 140 | 0.0E+00 | 0.0E+00 | 0.00 | 0.10 | 95 | 21 | — |

In Table 1-2, B denotes the specific surface area ($m^2/g$) of the silica fine particle, D/S/B before washing denotes the value (D/S)/B of the ratio of the silica fine particle analyzed by solid-state $^{29}$Si—NMR DD/MAS, D/S/B after washing denotes the value (D/S)/B of the ratio of the silica fine particle after washing with chloroform, Sn denotes {(a-b)×c×NA}/(d×e), C amount denotes the carbon amount, and number-average particle diameter denotes the number-average particle diameter of primary particles of the silica fine particle. For example, a value of “1.5E-03” denotes “$1.5\times10^{-3}$”.

TABLE 2

| | Toner production method | Weight-average particle diameter/ μm | Binder resin | Release agent type | Release agent melting point/ ° C. | Release agent amount/ parts by mass | *1 | Sw/ area % |
|---|---|---|---|---|---|---|---|---|
| Toner particle 1 | Pulverization | 7.6 | PES | Fischer-Tropsch | 105 | 5.5 | Yes | 50 |
| Toner particle 2 | Pulverization | 7.6 | PES | Fischer-Tropsch | 105 | 4.0 | Yes | 35 |
| Toner particle 3 | Pulverization | 7.6 | PES | Fischer-Tropsch | 105 | 7.6 | Yes | 60 |
| Toner particle 4 | Pulverization | 7.6 | PES | Fischer-Tropsch | 105 | 0.5 | Yes | 10 |
| Toner particle 5 | Pulverization | 7.6 | PES | Fischer-Tropsch | 105 | 10.0 | Yes | 70 |
| Toner particle 6 | Pulverization | 7.6 | PES | Fischer-Tropsch | 105 | 0.1 | Yes | 1 |
| Toner particle 7 | Pulverization | 7.6 | PES | Carnauba | 83 | 10.0 | Yes | 60 |
| Toner particle 8 | Pulverization | 7.6 | PES | Carnauba | 83 | 1.0 | Yes | 10 |
| Toner particle 9 | Pulverization | 7.6 | PES | Carnauba | 83 | 15.0 | Yes | 70 |
| Toner particle 10 | Pulverization | 7.5 | StAc | Carnauba | 83 | 15.0 | Yes | 60 |
| Toner particle 11 | Pulverization | 7.5 | StAc | Fischer-Tropsch | 105 | 7.6 | Yes | 60 |
| Toner particle 12 | Emulsion aggregation | 8.4 | StAc | Fischer-Tropsch | 105 | 6.0 | Yes | 45 |

In the table, PES denotes a polyester resin, StAc denotes a styrene acrylic resin, *1 denotes the presence or absence of a release agent on the surface of the toner particle, and Sw denotes the abundance (area %) of the release agent on the surface of the toner particle.

TABLE 3

| | | Toner particle | External addition time/ sec | Silica fine particle No. | Added parts of silica fine particle | Ssi/ area % | Sw/ Ssi | * 2 | Added parts of strontium titanate fine particle | Si/Sr |
|---|---|---|---|---|---|---|---|---|---|---|
| Example 1 | Toner 1 | Toner particle 1 | 180 | 1 | 1.4 | 50 | 1.00 | Yes | 0.20 | 0.71 |
| Example 2 | Toner 2 | Toner particle 1 | 180 | 2 | 1.4 | 50 | 1.00 | Yes | 0.20 | 0.72 |
| Example 3 | Toner 3 | Toner particle 1 | 180 | 3 | 1.4 | 50 | 1.00 | Yes | 0.20 | 0.71 |
| Example 4 | Toner 4 | Toner particle 1 | 180 | 4 | 1.4 | 50 | 1.00 | Yes | 0.20 | 0.71 |
| Example 5 | Toner 5 | Toner particle 1 | 180 | 5 | 1.4 | 50 | 1.00 | Yes | 0.20 | 0.70 |
| Example 6 | Toner 6 | Toner particle 1 | 180 | 6 | 1.4 | 50 | 1.00 | Yes | 0.20 | 0.69 |
| Example 7 | Toner 7 | Toner particle 2 | 180 | 6 | 1.4 | 40 | 0.88 | Yes | 0.20 | 0.69 |
| Example 8 | Toner 8 | Toner particle 3 | 180 | 6 | 1.4 | 55 | 1.09 | Yes | 0.20 | 0.69 |
| Example 9 | Toner 9 | Toner particle 4 | 180 | 6 | 1.6 | 55 | 0.18 | Yes | 0.20 | 0.80 |
| Example 10 | Toner 10 | Toner particle 5 | 180 | 6 | 1.2 | 52 | 1.35 | Yes | 0.20 | 0.61 |
| Example 11 | Toner 11 | Toner particle 5 | 180 | 6 | 2.0 | 90 | 0.78 | Yes | 0.20 | 1.02 |
| Example 12 | Toner 12 | Toner particle 5 | 240 | 6 | 0.7 | 30 | 2.33 | Yes | 0.20 | 0.35 |
| Example 13 | Toner 13 | Toner particle 5 | 240 | 7 | 1.5 | 30 | 2.33 | Yes | 0.20 | 0.74 |
| Example 14 | Toner 14 | Toner particle 5 | 300 | 8 | 0.3 | 25 | 2.80 | Yes | 0.20 | 0.15 |
| Example 15 | Toner 15 | Toner particle 5 | 300 | 9 | 0.3 | 25 | 2.80 | Yes | 0.20 | 0.16 |
| Example 16 | Toner 16 | Toner particle 5 | 300 | 10 | 0.3 | 25 | 2.80 | Yes | 0.20 | 0.15 |
| Example 17 | Toner 17 | Toner particle 5 | 300 | 10 | 0.3 | 25 | 2.80 | Yes | 0.30 | 0.11 |
| Example 18 | Toner 18 | Toner particle 5 | 300 | 10 | 0.3 | 25 | 2.80 | Yes | 0.02 | 1.48 |
| Example 19 | Toner 19 | Toner particle 7 | 300 | 10 | 0.3 | 25 | 2.40 | Yes | 0.02 | 1.50 |
| Example 20 | Toner 20 | Toner particle 8 | 300 | 10 | 0.3 | 25 | 0.40 | Yes | 0.02 | 1.49 |
| Example 21 | Toner 21 | Toner particle 9 | 300 | 10 | 0.3 | 25 | 2.80 | Yes | 0.02 | 1.48 |
| Example 22 | Toner 22 | Toner particle 10 | 300 | 10 | 0.3 | 25 | 2.40 | Yes | 0.02 | 1.50 |
| Example 23 | Toner 23 | Toner particle 12 | 300 | 10 | 0.3 | 26 | 1.73 | Yes | 0.02 | 1.49 |
| C.E. 1 | Toner 24 | Toner particle 1 | 180 | 11 | 2.0 | 70 | 0.71 | Yes | 0.20 | 0.98 |
| C.E. 2 | Toner 25 | Toner particle 1 | 180 | 12 | 2.0 | 70 | 0.71 | Yes | 0.20 | 1.02 |
| C.E. 3 | Toner 26 | Toner particle 11 | 180 | 13 | 1.6 | 55 | 1.09 | Yes | 0.20 | 0.81 |
| C.E. 4 | Toner 27 | Toner particle 11 | 180 | 14 | 1.6 | 55 | 1.09 | Yes | 0.20 | 0.80 |
| C.E. 5 | Toner 28 | Toner particle 1 | 180 | 15 | 1.0 | 45 | 1.11 | Yes | 0.10 | 1.05 |
| C.E. 6 | Toner 29 | Toner particle 1 | 180 | 16 | 1.4 | 50 | 1.00 | Yes | 0.14 | 1.03 |
| C.E. 7 | Toner 30 | Toner particle 1 | 180 | 17 | 1.4 | 50 | 1.00 | No | 0.14 | 1.10 |
| C.E. 8 | Toner 31 | Toner particle 6 | 180 | 1 | 1.4 | 48 | 0.02 | Yes | 0.14 | 1.05 |

In the table, C. E. denotes Comparative example. Ssi denotes the coverage ratio of the surface of the toner particle by the silica fine particle. Sw denotes the abundance of the release agent on the surface of the toner particle. * 2 denotes the presence or absence of fragment ions of Formula (1), and Si/Sr denotes the value of the element intensity-basis ratio of the content of the silica fine particle relative to the content of the strontium titanate fine particle in the toner, by X-ray fluorescence analysis.

TABLE 4

| | Charge quantity (μC/g) 32.5° C./80% RH | | Charge quantity | Charging stability | Fogging evaluation | | Trailing edge |
|---|---|---|---|---|---|---|---|
| | Initial | 20,000 prints | rank | rank | Value | Rank | offset |
| Example 1 | −31.0 | −30.0 | A | A | 0.2 | A | A |
| Example 2 | −30.5 | −29.5 | A | A | 0.2 | A | A |
| Example 3 | −30.5 | −29.0 | A | A | 0.2 | A | A |
| Example 4 | −30.3 | −29.2 | A | A | 0.3 | A | A |
| Example 5 | −30.0 | −28.2 | A | A | 0.2 | A | A |
| Example 6 | −30.5 | −29.1 | A | A | 0.3 | A | A |
| Example 7 | −30.2 | −28.9 | A | A | 0.3 | A | A |
| Example 8 | −29.5 | −28.1 | B | A | 0.3 | A | A |
| Example 9 | −31.0 | −29.1 | A | A | 1.0 | A | B |
| Example 10 | −29.2 | −27.0 | B | B | 0.4 | A | A |
| Example 11 | −31.2 | −30.0 | A | A | 1.1 | B | B |
| Example 12 | −28.5 | −26.1 | B | B | 0.8 | A | A |
| Example 13 | −27.8 | −24.6 | B | B | 1.5 | B | A |
| Example 14 | −27.6 | −24.5 | B | B | 1.1 | B | A |
| Example 15 | −27.8 | −24.5 | B | B | 1.1 | B | A |
| Example 16 | −27.4 | −24.1 | C | B | 1.2 | B | A |
| Example 17 | −28.1 | −24.2 | B | B | 1.6 | B | B |
| Example 18 | −26.5 | −24.0 | C | B | 2.0 | C | A |
| Example 19 | −28.0 | −25.0 | B | B | 2.1 | C | A |
| Example 20 | −29.1 | −25.8 | B | B | 1.8 | B | C |
| Example 21 | −26.9 | −22.8 | C | C | 2.4 | C | A |
| Example 22 | −29.1 | −25.0 | B | C | 2.1 | C | A |
| Example 23 | −29.6 | −26.0 | B | B | 1.5 | B | A |
| Comparative example 1 | −28.1 | −19.1 | B | E | 2.1 | C | B |
| Comparative example 2 | −22.1 | −11.5 | E | E | 2.8 | C | B |
| Comparative example 3 | −23.4 | −13.2 | D | E | 3.2 | D | A |
| Comparative example 4 | −25.2 | −15.8 | C | E | 4.5 | D | A |
| Comparative example 5 | −26.7 | −18.6 | C | E | 2.5 | C | A |
| Comparative example 6 | −24.1 | −16.2 | D | D | 2.8 | C | A |
| Comparative example 7 | −24.0 | −15.0 | D | E | 2.9 | C | A |
| Comparative example 8 | −29.7 | −26.8 | B | B | 1.1 | B | D |

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-075105, filed Apr. 28, 2022 which is hereby incorporated by reference herein in its entirety.

What is claimed is:

1. A toner comprising:

a toner particle comprising a binder resin and a release agent; and a silica fine particle on a surface of the toner particle;

the release agent being present on the surface of the toner particle, wherein fragment ions corresponding to a structure represented by Formula (1) are observed in a measurement of the silica fine particle by time-of-flight secondary ion mass spectrometry

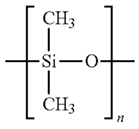

(1)

where n represents an integer of 1 or more;

$0.05 \leq Sn \leq 0.20$ and $Sn = \{(a-b) \times c \times NA\} / (d \times e)$ when 2.00 g of the silica fine particle is dispersed in a mixed solution of 25.0 g of ethanol and 75.0 g of a 20 mass % aqueous solution of NaCl, followed by a titration operation using a sodium hydroxide (NaOH) solution, when a is a NaOH titer (L) of the NaOH solution required to adjust to 9.0 a pH of the mixed solution in which the silica fine particle has been dispersed, b is a NaOH titer (L) of the NaOH solution required to adjust to 9.0 a pH of the mixed solution of 25.0 g of ethanol and 75.0 g of a 20 mass % aqueous solution of NaCl without the silica fine particle having been dispersed, c is a concentration (mol/L) of the NaOH solution, NA is Avogadro's number, d is a mass (g) of the silica fine particle, and e is a BET specific surface area ($nm^2/g$) of the silica fine particle;

in a chemical shift obtained by solid-state $^{29}Si$—NMR DD/MAS of the silica fine particle, when D is an area of a peak having a peak top present in a range from −25 to −15 ppm, S is the sum total of areas of peaks of an M unit, a D unit, a T unit and a Q unit present in a range from −140 to 100 ppm, and B ($m^2/g$) is a specific surface area of the silica fine particle, the $M$ unit is$(R_i)(R_j)(R_k)SiO_{1/2}$ the $D$ unit is$(R_g)(R_h)Si(O_{1/2})_2$ the $T$ unit is $R_mSi(O_{1/2})_3$ the $Q$ unit is $Si(O_{1/2})_4$ where $R_i$, $R_j$ $R_k$, $R_g$, $R_h$, and $R_m$ are an alkyl group, a halogen atom, a hydroxy group, an acetoxy group or an alkoxy group, (D/S)/B is $5.7\times10^{-4}$ to $4.9\times10^{-3}$ and (D/S)/B measured after washing the silica fine particle with chloroform is $1.7\times10^{-4}$ to $4.9\times10^{-3}$;

(D1/D) is 0.10 to 0.30 when D1 is an area of a peak having a peak top present in a range of more than −19 ppm and −17 ppm or less; and Sw is 10 to 70 area % when Sw (area %) is an abundance of the release agent on the surface of the toner particle.

2. The toner according to claim 1, wherein Ssi is 25 to 90 area % when Ssi (area %) is a coverage ratio of the surface of the toner particle by the silica fine particle calculated on the basis of an observation image of the surface of the toner using a scanning electron microscope.

3. The toner according to claim 1, wherein (Sw/Ssi) is 0.18 to 2.80 when Ssi (area %) is a coverage ratio of the surface of the toner particle by the silica fine particle calculated on the basis of an observation image of the surface of the toner using a scanning electron microscope.

4. The toner according to claim 1, wherein a carbon amount immobilization rate upon washing of the silica fine particle with chloroform is 30 to 70%, where the carbon amount immobilization rate (%) is (carbon amount in silica fine particle treated with chloroform)/(carbon amount in silica fine particle before washing with chloroform)×100.

5. The toner according to claim 1, wherein a content of the silica fine particle is 0.2 to 2.2 parts by mass relative to 100 parts by mass of the toner particle.

6. The toner according to claim 1, wherein a number-average particle diameter of primary particle of the silica fine particle is 5 to 50 nm.

7. The toner according to claim 1, wherein the silica fine particle is surface-treated with at least a compound represented by Formula (3)

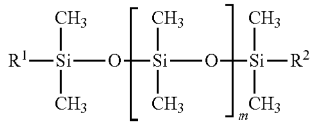

(3)

where $R^1$ and $R^2$ independently represent a carbinol group, a hydroxy group, an epoxy group, a carboxy group, an alkyl group or a hydrogen atom, and m is an integer of 1 to 200.

8. The toner according to claim 1, wherein the toner further comprises a strontium titanate fine particle on the surface of the toner particle; and a value (Si/Sr) of an element intensity-basis ratio of a content of the silica fine particle relative to a content of the strontium titanate fine particle, on the basis of an X-ray fluorescence analysis of the toner is 0.10 to 1.50.

9. The toner according to claim 1, wherein the release agent is at least one member selected from the group consisting of a hydrocarbon wax and an ester wax.

10. The toner according to claim 1, wherein a content of the release agent is 0.5 to 15.0 parts by mass relative to 100 parts by mass of the binder resin.

11. The toner according to claim 1, wherein the silica fine particle is a silicone-oil-treated product of a silica fine particle treated with a cyclic siloxane.

* * * * *